United States Patent
Rogers et al.

(10) Patent No.: US 12,084,395 B2
(45) Date of Patent: Sep. 10, 2024

(54) ORGANIC MATTER PROCESSING APPARATUS FOR PROMOTING NET REDUCTION OF METHANE AND OTHER GREENHOUSE GAS EMISSIONS

(71) Applicant: Chewie Labs LLC, San Bruno, CA (US)

(72) Inventors: Matthew Lee Rogers, San Francisco, CA (US); Harry E. Tannenbaum, San Francisco, CA (US); Adam Mittleman, Redwood City, CA (US); Kelly Joan Veit, San Francisco, CA (US); Kristen Rose Virdone, San Francisco, CA (US); Alyssa Noelle Pollack, Lone Tree, CO (US); Azita Sayadi, San Francisco, CA (US); Shayan Sayadi, Mill Valley, CA (US); Geoffrey Becker Hill, Seattle, WA (US); Jaideep Singh Chavan, Mountain View, CA (US); William Bryson Gardner, Louisville, CO (US); Emma Elizabeth Feshbach Bright, Palo Alto, CA (US); Pinida Jan Moolsintong, San Francisco, CA (US); Taylor A. Nam, San Francisco, CA (US); Rochus Emanuel Jacob, San Francisco, CA (US); Saket Vora, Santa Cruz, CA (US)

(73) Assignee: Chewie Labs LLC, San Bruno, CA (US)

( * ) Notice: Subject to any disclaimer, the term of this patent is extended or adjusted under 35 U.S.C. 154(b) by 0 days.

(21) Appl. No.: 18/310,674

(22) Filed: May 2, 2023

(65) Prior Publication Data
US 2023/0265022 A1    Aug. 24, 2023

Related U.S. Application Data

(63) Continuation of application No. 17/897,428, filed on Aug. 29, 2022, now Pat. No. 11,680,025.

(Continued)

(51) Int. Cl.
*C05F 17/907* (2020.01)
*B02C 18/00* (2006.01)
(Continued)

(52) U.S. Cl.
CPC ........ *C05F 17/907* (2020.01); *B02C 18/0092* (2013.01); *B02C 23/24* (2013.01);
(Continued)

(58) Field of Classification Search
CPC ........ C05F 17/907; C05F 17/60; C05F 17/96; C05F 17/964; C05F 9/02; C05F 9/04;
(Continued)

(56) References Cited

U.S. PATENT DOCUMENTS

| | | | |
|---|---|---|---|
| 5,340,536 A | 8/1994 | Datar et al. | |
| 5,634,600 A * | 6/1997 | Kubota | F26B 11/12 241/199.12 |

(Continued)

FOREIGN PATENT DOCUMENTS

| | | | | |
|---|---|---|---|---|
| EP | 0791568 | 8/1997 | | |
| GB | 2533643 A * | 12/2014 | ............. | B02C 18/08 |

(Continued)

OTHER PUBLICATIONS

Jayalakshmi et al., "Waste to Wealth—A Novel Approach for Food Waste Management"; published in: 2017 IEEE International Conference on Electrical, Instrumentation and Communication Engineering (ICEICE); Date of Conference: Apr. 27-28, 2017.

(Continued)

*Primary Examiner* — Michael L Hobbs
(74) *Attorney, Agent, or Firm* — Van Court & Aldridge LLP

(57) ABSTRACT

Embodiments disclosed herein provide an organic matter processing apparatus and method for the use thereof to convert organic matter into a ground and desiccated product. This can be accomplished using a bucket assembly that can grind, paddle, and heat organic matter contained therein. An air treatment system is provided to treat the air interacting with the organic matter.

17 Claims, 12 Drawing Sheets

Related U.S. Application Data

(60) Provisional application No. 63/239,852, filed on Sep. 1, 2021.

(51) Int. Cl.
| | | |
|---|---|---|
| *B02C 23/24* | (2006.01) | |
| *B09B 3/35* | (2022.01) | |
| *B09B 3/40* | (2022.01) | |
| *C05F 9/02* | (2006.01) | |
| *C05F 9/04* | (2006.01) | |
| *C05F 17/60* | (2020.01) | |
| *C05F 17/964* | (2020.01) | |
| *B02C 18/06* | (2006.01) | |
| *B02C 18/16* | (2006.01) | |
| *B09B 101/70* | (2022.01) | |

(52) U.S. Cl.
CPC ............... *B09B 3/35* (2022.01); *B09B 3/40* (2022.01); *C05F 9/02* (2013.01); *C05F 9/04* (2013.01); *C05F 17/60* (2020.01); *C05F 17/964* (2020.01); *B02C 18/067* (2013.01); *B02C 2018/162* (2013.01); *B09B 2101/70* (2022.01)

(58) Field of Classification Search
CPC ............. B02C 18/0092; B02C 18/067; B02C 18/0084; B02C 13/288; B02C 23/24; B02C 2018/162; B02C 25/00; B09B 3/35; B09B 3/40; B09B 2101/70
See application file for complete search history.

(56) References Cited

U.S. PATENT DOCUMENTS

| | | | |
|---|---|---|---|
| 6,150,939 | A | 11/2000 | Lin |
| 7,240,865 | B2 | 7/2007 | Choi |
| 9,308,535 | B2 | 4/2016 | Delgado et al. |
| 9,597,620 | B2 | 3/2017 | Verdegan et al. |
| 9,895,726 | B1 | 2/2018 | Atkinson et al. |
| 10,065,196 | B1 | 9/2018 | Tran et al. |
| 10,906,046 | B2 | 2/2021 | Crepeau et al. |
| 11,241,694 | B2 | 2/2022 | Crepeau et al. |
| 11,278,908 | B2 | 3/2022 | Crepeau et al. |
| 11,389,804 | B2 | 7/2022 | Hayman et al. |
| 11,541,397 | B2 | 1/2023 | Crepeau et al. |
| 2003/0155228 | A1 | 8/2003 | Mills |
| 2004/0175303 | A1 | 9/2004 | Lin |
| 2004/0251339 | A1 | 12/2004 | Strutz |
| 2004/0265197 | A1 | 12/2004 | Lin |
| 2007/0190212 | A1 | 8/2007 | Lee |
| 2008/0067270 | A1 | 3/2008 | Strutz |
| 2009/0113791 | A1 | 5/2009 | Bertin et al. |
| 2009/0200180 | A1 | 8/2009 | Capote |
| 2010/0140248 | A1 | 6/2010 | Yi et al. |
| 2011/0020184 | A1 | 1/2011 | Sun |
| 2011/0062259 | A1 | 3/2011 | Gregoire |
| 2011/0151553 | A1 | 6/2011 | Cruson et al. |
| 2012/0021504 | A1 | 1/2012 | Bradlee |
| 2012/0034350 | A1 | 2/2012 | Gard et al. |
| 2012/0298658 | A1 | 11/2012 | Bosetti et al. |
| 2013/0217111 | A1 | 8/2013 | Chang |
| 2013/0263786 | A1 | 10/2013 | Meisel, III et al. |
| 2014/0117126 | A1 | 5/2014 | Ceru et al. |
| 2015/0031123 | A1* | 1/2015 | Delgado ............ C05F 17/907 435/290.4 |
| 2015/0196920 | A1 | 7/2015 | Celli et al. |
| 2015/0376882 | A1 | 12/2015 | Park |
| 2016/0022112 | A1 | 1/2016 | Davenport |
| 2016/0207845 | A1 | 7/2016 | Delgado et al. |
| 2016/0295906 | A1 | 10/2016 | Jacobsen et al. |
| 2017/0197857 | A1 | 7/2017 | Whitener et al. |
| 2017/0226466 | A1 | 8/2017 | Grillo et al. |
| 2017/0260111 | A1 | 9/2017 | Maghas et al. |
| 2017/0349501 | A1 | 12/2017 | Buzruk |
| 2018/0093814 | A1 | 4/2018 | Espinosa |
| 2018/0148391 | A1 | 5/2018 | Ashbee et al. |
| 2019/0030544 | A1 | 1/2019 | Kratzer, III et al. |
| 2019/0083989 | A1 | 3/2019 | Tran et al. |
| 2019/0152698 | A1 | 5/2019 | Zhao |
| 2020/0001389 | A1 | 1/2020 | Ryan et al. |
| 2020/0147617 | A1 | 5/2020 | Atkinson et al. |
| 2020/0148604 | A1 | 5/2020 | Atkinson et al. |
| 2020/0353473 | A1 | 11/2020 | Hayman et al. |
| 2020/0353474 | A1 | 11/2020 | Crepeau et al. |
| 2021/0154676 | A1 | 5/2021 | Crepeau et al. |
| 2022/0001389 | A1 | 1/2022 | Maxwell et al. |
| 2022/0242799 | A1 | 8/2022 | Ying et al. |
| 2022/0347693 | A1 | 11/2022 | Hayman et al. |
| 2023/0142555 | A1 | 5/2023 | Hotte et al. |
| 2023/0149939 | A1 | 5/2023 | Crepeau et al. |

FOREIGN PATENT DOCUMENTS

| | | |
|---|---|---|
| JP | 2002-001262 | 1/2002 |
| JP | 2004-216253 | 12/2004 |
| JP | 2006255592 | 9/2006 |
| KR | 19980047631 | 9/1998 |
| KR | 100692243 | 3/2007 |
| KR | 100694645 B1 | 3/2007 |
| KR | 100694646 B1 | 3/2007 |
| KR | 20090123375 | 12/2009 |
| KR | 101017615 B1 | 2/2011 |
| KR | 101017616 B1 | 2/2011 |
| KR | 101053035 B1 | 8/2011 |
| KR | 101187381 | 10/2012 |
| KR | 101332453 | 11/2013 |
| KR | 101461608 | 12/2014 |
| KR | 20150112689 | 10/2015 |
| KR | 20160044110 | 4/2016 |
| KR | 101866863 | 6/2018 |
| KR | 101866863 B1 | 6/2018 |
| KR | 300966490 S | 7/2018 |
| KR | 101882829 B1 | 8/2018 |
| KR | 101884662 B1 | 8/2018 |
| KR | 101921624 B1 | 11/2018 |
| KR | 101941620 | 1/2019 |
| KR | 101941620 B1 | 1/2019 |
| KR | 301095230 S | 2/2021 |
| KR | 301109396 S | 5/2021 |
| KR | 301109397 S | 5/2021 |
| KR | 301109403 S | 5/2021 |
| KR | 301109404 S | 5/2021 |
| KR | 301140601 S | 12/2021 |
| KR | 301154947 S | 3/2022 |
| KR | 102474495 B1 | 12/2022 |
| KR | 301202238 S | 2/2023 |
| KR | 1020230060939 A | 5/2023 |
| KR | 301223966 S | 7/2023 |
| WO | WO2008030997 | 3/2008 |
| WO | WO2009157744 | 12/2009 |
| WO | WO2015182929 | 12/2015 |
| WO | WO2015182929 A1 | 12/2015 |
| WO | WO2016060290 | 4/2016 |
| WO | WO2017083944 | 5/2017 |
| WO | WO2022055212 A1 | 3/2022 |

OTHER PUBLICATIONS

Zhu, "Food Waste Drum Sieve Design"; Mar. 26, 2015; Technology, Communication and Transport; Sovonia University of Applied Sciences.

* cited by examiner

ORGANIC MATTER PROCESSING APPARATUS FOR PROMOTING NET REDUCTION OF METHANE AND OTHER GREENHOUSE GAS EMISSIONS

CROSS-REFERENCE TO A RELATED APPLICATION

This patent application is a continuation of U.S. patent application Ser. No. 17/897,428, filed Aug. 29, 2022 (now U.S. Pat. No. 11,680,025), which claims the benefit of U.S. Provisional Application No. 63/239,852, filed Sep. 1, 2021, the disclosures of which are incorporated herein in their entireties.

TECHNICAL FIELD

This patent specification relates to an organic matter processing apparatus, and more particularly to a residential oriented apparatus and methods for the use thereof for converting organic matter to a ground and desiccated product.

BACKGROUND

Individuals, groups of people, and families living and eating in their respective residences generate resident-based organic matter that degrades into methane—a powerful greenhouse gas—without oxygen. These harmful emissions can be avoided by diverting the resident-based organic matter such as uneaten or spoiled food from landfills. One way to divert food and other organic matter from landfills is to process the food and other organic matter into a partially descicatted product using a conventional food recycler or food grinder. These conventional food recylers and food grinders, however, are not efficient in processing food and other organic matter.

The food industry (e.g., restaurants, grocery stores, etc.) has followed many traditional paths for handling food. For example, the food industry strives to prevent food from non-use or spoil by attempting to sell the food according to a first in first out method where older product is prioritized by sale. If the food is fit for consumption, such food may be provided to a food bank or charity. If the food is unfit for human consumption, but is safe for use as animal feed, the food can be used as animal feed. If the food is unsafe for human consumption and for animal feed, the food can be turned into compost. If the food is unsuitable for composting, the food may be converted into energy through anaerobic digestion (e.g., microorganisms convert the food into a biogas). Lastly, the food can be sent to a landfill if any of the other options are not viable. Each of these paths, however, require transportation of non-descicatted (and relatively heavy) food matter to the appropriate facilities. The volume and weight of the food may require use of heavy internal combustion engine trucks—thereby further contributing to greenhouse gas—to transport the food. In addition, the heavy trucks further increase wear and tear on roads and other infrastructure, and require cost for manpower and equipment.

Accordingly, what is needed is a residential or consumer oriented organic matter processing apparatus capable of efficiently and consistently rendering an end product that is curated according to specific properties to enable lightweight and lowcost shipping of the end product for use in a regulatory approved upcycling process.

BRIEF SUMMARY

Embodiments disclosed herein provide an organic matter processing apparatus and method for the use thereof to convert organic matter into a ground and desiccated product. This can be accomplished using a bucket assembly that can grind, paddle, and heat organic matter contained therein. An air treatment system is provided to treat the air interacting with the organic matter.

A further understanding of the nature and advantages of the embodiments discussed herein may be realized by reference to the remaining portions of the specification and the drawings.

Figure 1:
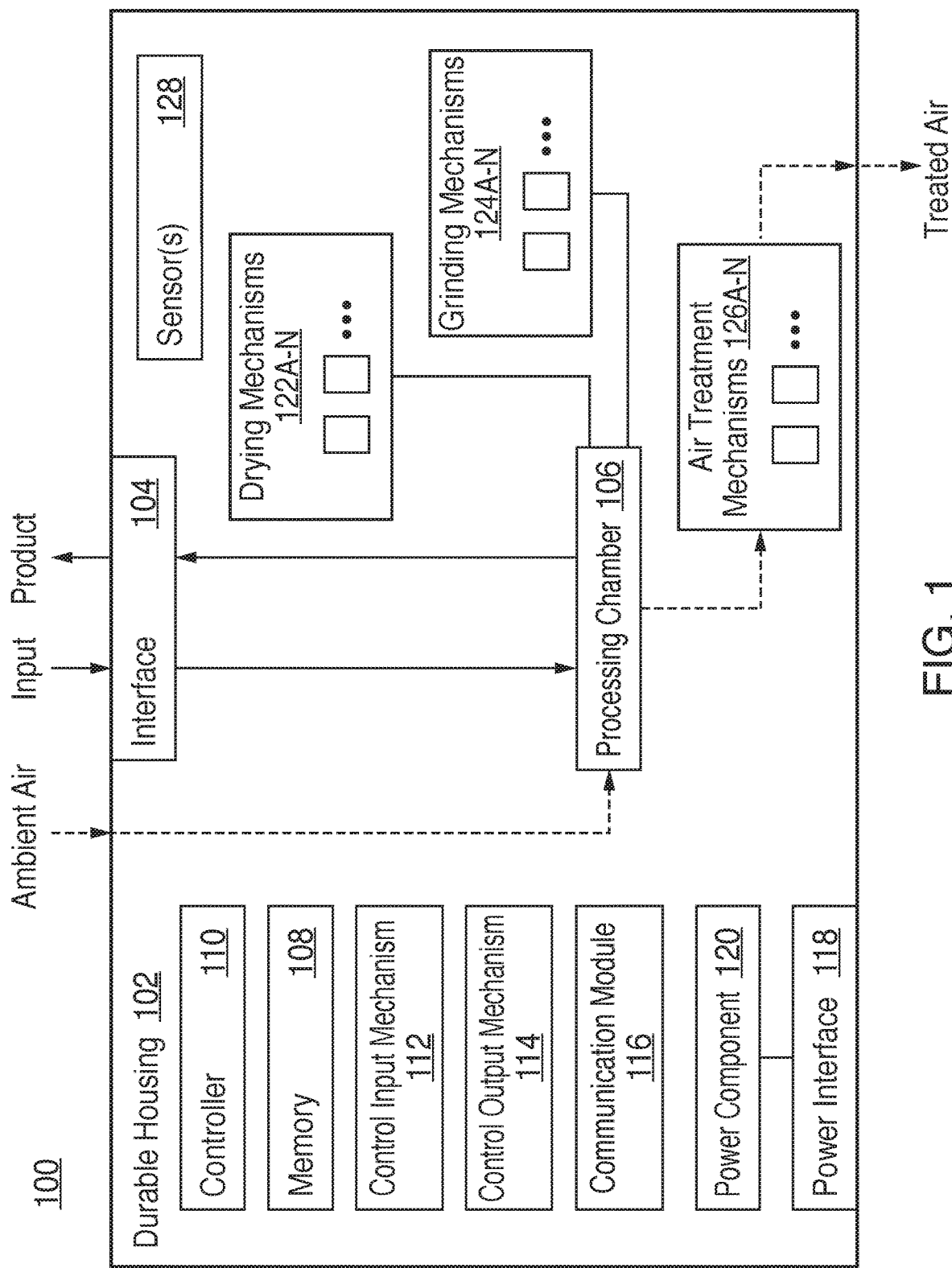
FIG. 1 includes a high-level illustration of an organic matter processing apparatus in accordance with various embodiments according to embodiment.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

As defined herein, an organic matter processing apparatus (OMPA) is an aero-mechanical device operative to convert OMPA input into an OMPA output using judicious combinations of physical, aero, and thermal processes including grinding, paddling, electric heating, and airflow.

OMPA input is defined herein as predominantly organic matter that is intended for processing by the OMPA. OMPA input can include food matter and/or mixed organic matter. Food matter can include consumable food items such as fats, oils, sweets such as sugars and chocolates, dairy products such as milk, yogurt, cheese, proteins such as meat (and bones thereof), poultry (and bones thereof), fish (and bones thereof), beans, eggs, and nuts, vegetables, fruits, and starches such as bread, cereal, pasta, and rice. Food matter is sometimes referred to as foodstuffs. Mixed organic matter can include paper or other fiber materials (e.g., soiled napkins or paper towels), compostable resins, compostable plastics, cellulosic materials (e.g., compostable silverware), and other non-food organic materials. OMPA input can also include other types of biodegradable matter (e.g., compostable diapers).

For many implementations, OMPA input may include food matter and/or mixed organic matter that is post-consumer, post-commercial, or post-industrial in nature, matter that if not processed according to the present teachings could be considered as waste, garbage, refuse, leavings, remains, or scraps. By way of example, food that is leftover on a child's dinner plate, and not in suitable condition or quantity to be stored and served later as leftovers, can represent one example of OMPA input. As another example, items such as potato peels, apple cores, cantaloupe rinds, broccoli stumps, and so forth, and similar organic materials that are spun off from the food preparation process, can represent other examples of OMPA input.

OMPA output is defined herein as processed organics derived from transformation of organic matter processed by the OMPA to yield a ground and selectively desiccated product. The processed organics can be a substantially desiccated product having water content ranging between 0.1 and 30 percent of total weight, between 5 and 25 percent of total weight, between 5 and 20 percent of total weight, between 1 and 15 percent of total weight, between 5 and 15 percent of total weight, between 10 and 15 percent of total weight, between 10 and 20 percent of total weight, between 15-20 percent of total weight, or between 10 and 25 percent of total weight. Alternatively, the processed organics can be a substantially desiccated product having water content of less than 15 percent of total weight, less than 10 percent of total weight, or less than 5 percent of total weight. The processed organics can exist as granulated or ground media. One type of processed organics can be FOOD GROUNDS™.

As defined herein FOOD GROUNDS' refers to an OMPA output characterized as having a minimum nutritional value. FOOD GROUNDS™ can be derived from OMPA input comprised of a minimum percentage of food matter such that the FOOD GROUNDS™ OMPA output has the minimum nutritional value. The minimum percentage of food matter can ensure that the FOOD GROUNDS' OMPA output attains at least the minimum nutritional value. For example, a higher nutrient value OMPA output can be more readily obtained from food matter than from mixed organics such as fiber materials and cellulosic materials.

As defined herein, an OMPA output processor repurposes the OMPA output for a commercial purpose. For example, the OMPA output can be used as feed or feedstock for feed for animals or fish. In some embodiments, an OMPA output processor that receives FOOD GROUNDS' may produce a derivative product having a higher intrinsic value (e.g., nutritional, monetary, or both nutritional and monetary) than a derivative product produced primarily from mixed organics.

As defined herein, non-processed matter refers to matter that is not intended for processing by an OMPA or an OMPA output processor. Non-processed matter is not an OMPA input or an OMPA output. An example of non-processed matter can include inorganic matter such as, for example, metals, plastics, glass, ceramics, rocks, minerals, or any other substance that is not linked to the chemistry of life. Another example of non-processed matter can be yard waste such as grass clippings, leaves, flowers, branches, or the like. In very general terms, non-processed matter can refer to the garbage or waste that a resident or business disposes in a conventional trash bin for transport to a landfill processor, a recycle bin for transport to recyclables processor, or a yard waste bin for transport to a yard waste processor.

In one embodiment, the OMPA is designed to be used primarily in a residential context (e.g., in single family homes, townhouses, condos, apartment buildings, etc.) to convert residential based OMPA input into residential sourced OMPA output. Converting residential generated OMPA input to OMPA output can have a net positive effect in the reduction of methane and space occupied by landfills or compost centers by redirecting the OMPA input and the OMPA output thereof away from traditional reception centers of such material. Moreover, because the OMPA is user friendly, aesthetically pleasing, energy efficient, clean, and substantially odor free, the OMPA provides an easy to use platform for the residential sector to handle OMPA input (e.g., food scraps, etc.), thereby making the decision on what to do with residential based OMPA input an easier one to handle. The OMPA can convert OMPA input into FOOD GROUNDS overnight, where the FOOD GROUNDS are substantially odorless, easily transportable, and shelf-stable. The FOOD GROUNDS can remain in the OMPA until it is full, at which point the FOOD GROUNDS are removed and transported to an OMPA processing facility, which may convert the FOOD GROUNDS into a higher value food product (e.g., animal feed). It should be understood that OMPAs can be used to serve entire communities, cities, and industries. Use of OMPAs in these other sectors, as well as the residential sector, can result in diversion from landfills and further serve a goal of preventing OMPA input from becoming waste in the first place by converting it into usable products that can be used to enable more resilient, sustainable food systems.

Overview of Organic Matter Processing Apparatus

Figure 2B:
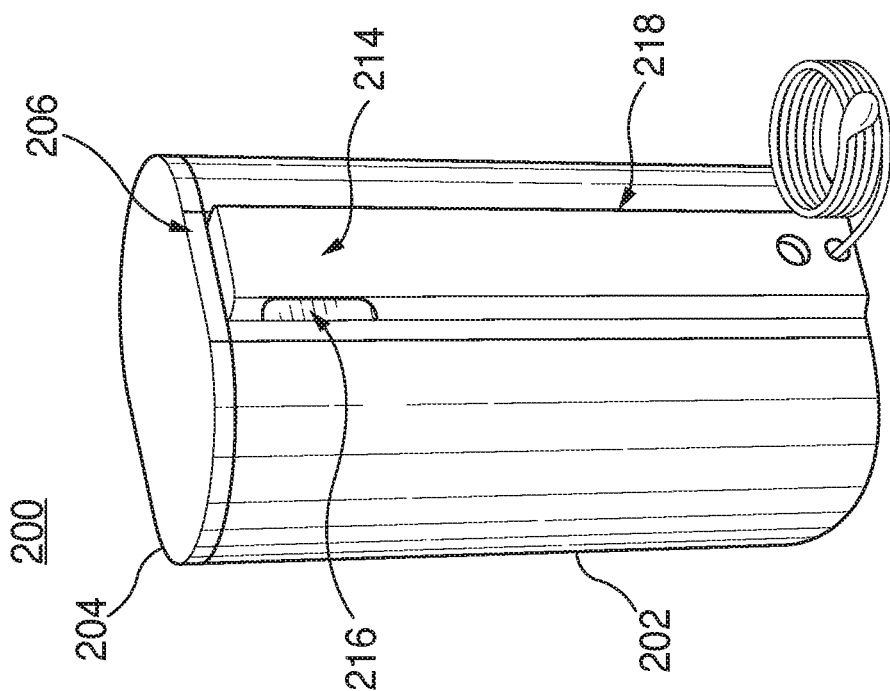
FIG. 2B includes another perspective view of the organic matter processing apparatus with the lid in an open position according to embodiment.
Figure 2A:
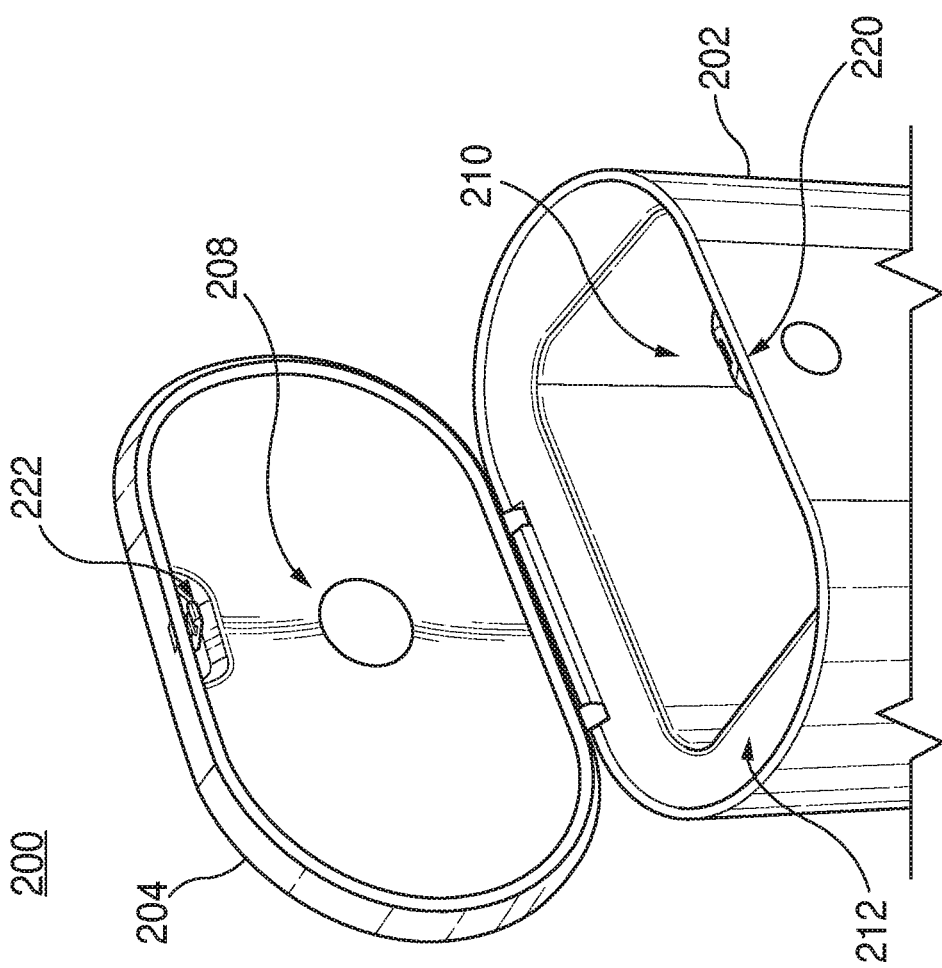
FIG. 2A includes a perspective view of an organic matter processing apparatus that includes a lid in a closed position according to embodiment.
Figure 3A:
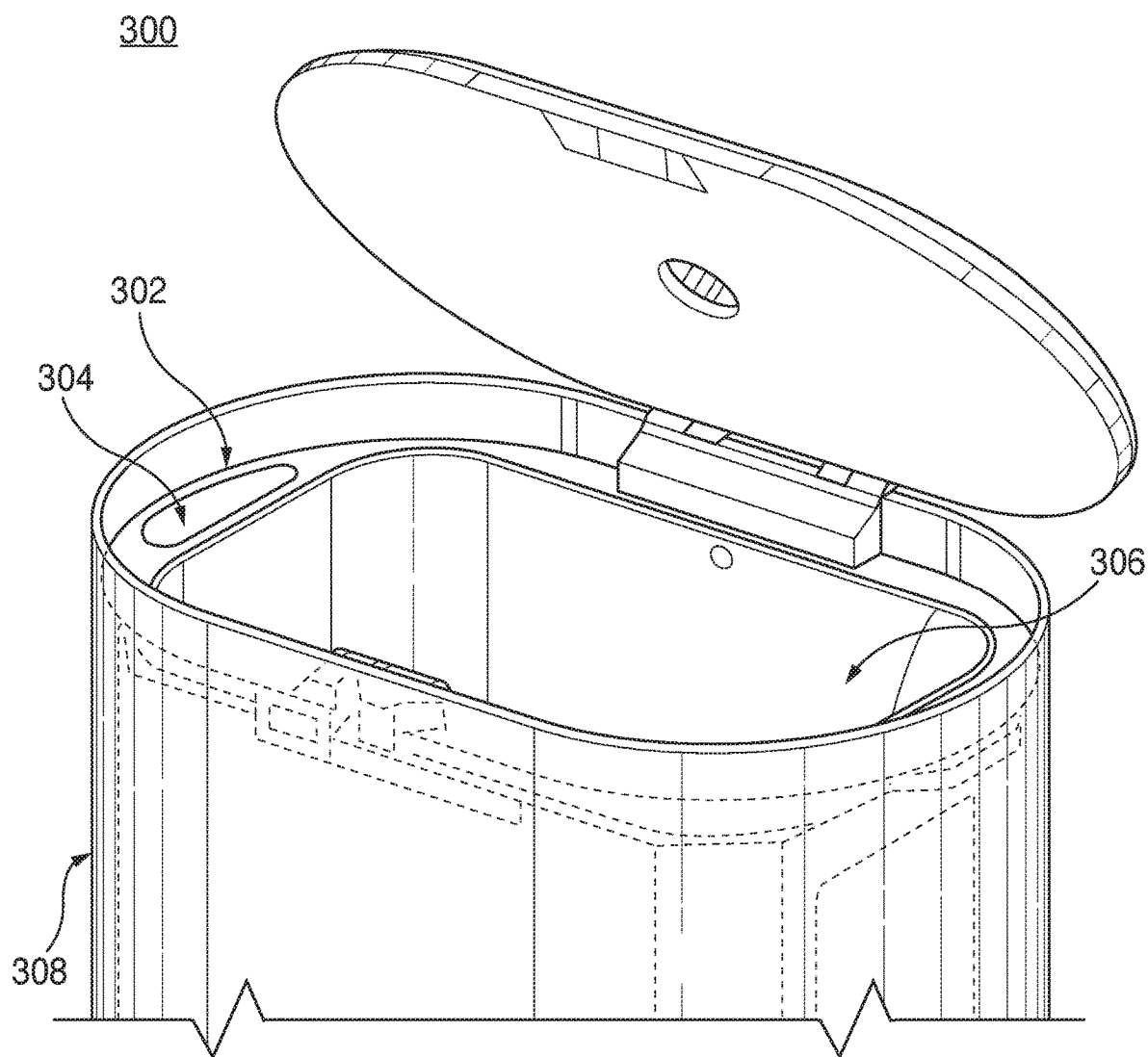
FIG. 3A includes a perspective view of an organic matter processing apparatus without its bezel to illustrate one possible location for the exhaust hood that extends over an intake vent according to embodiment.
Figure 3B:
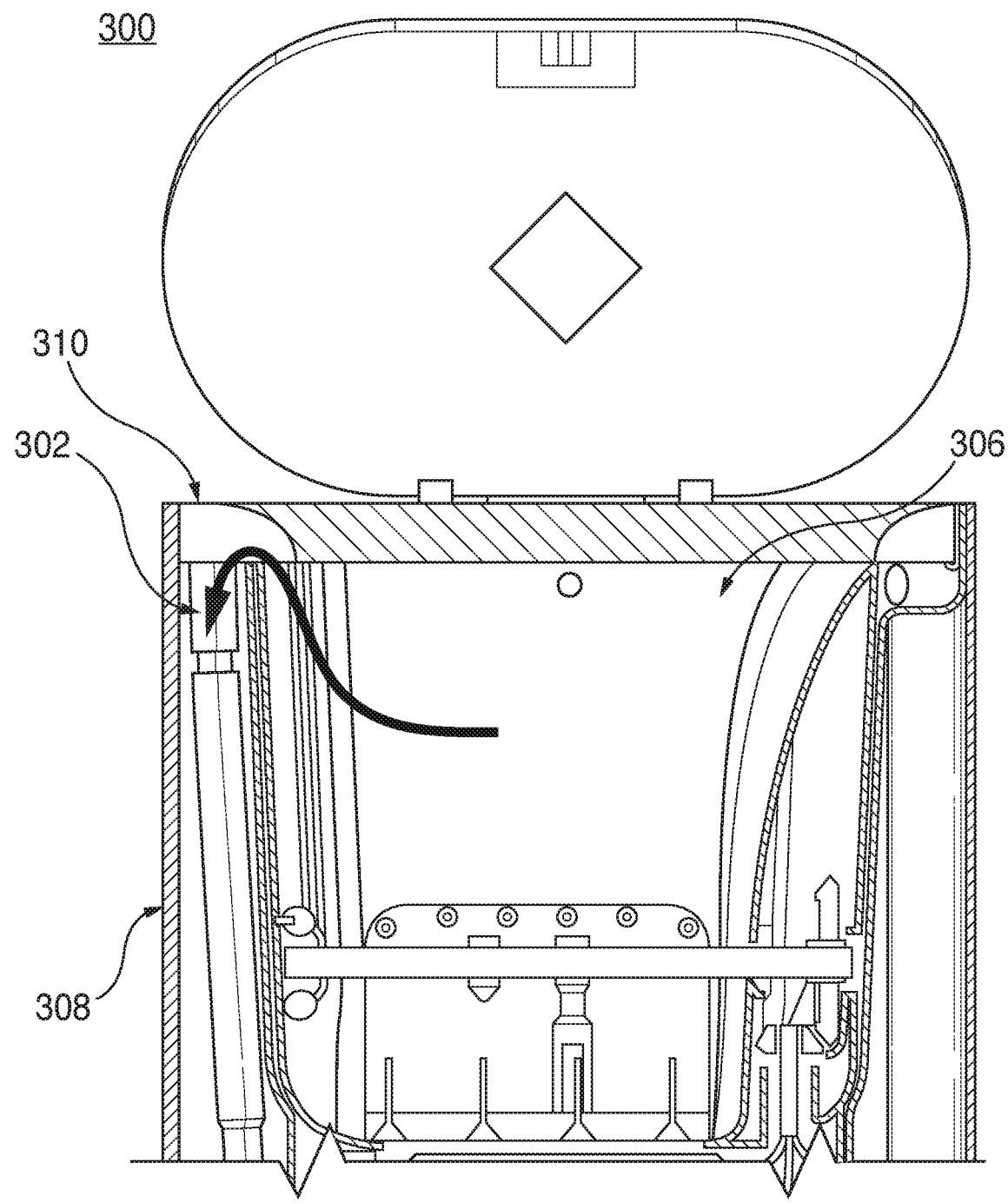
FIG. 3B illustrates how, when the bezel is installed in the organic matter processing apparatus, air in the processing chamber can flow underneath the bezel into a space above the edge of the receptacle and then downward through the used-air intake vent according to embodiment.

FIG. 1 includes a high-level illustration of a OMPA 100 in accordance with various embodiments. As further discussed below, OMPA 100 may have a durable housing 102 with an interface 104 through which a processing chamber 106 can be accessed. The interface 104 may serve as the ingress interface through which OMPA input can be deposited into the processing chamber 106 and the egress interface through which the product can be retrieved from the processing chamber 106. As shown in FIGS. 2A-B, the durable housing 102 may take the form of a roughly cylindrical container that has an aperture along its top end.

Instructions for operating OMPA 100 may be stored in a memory 108. The memory 108 may be comprised of any suitable type of storage medium, such as static random-access memory (SRAM), dynamic random-access memory (DRAM), electrically erasable programmable read-only memory (EEPROM), flash memory, or registers. In addition to storing instructions that can be executed by the controller 110, the memory 108 can also store data that is generated by OMPA 100. For example, values generated by one or more sensors 128 included in OMPA 100 may be stored in the memory 108 in preparation for further analysis, as further discussed below. As further discussed below, these values may relate to characteristics (e.g., humidity or temperature) of the air traveling through OMPA 100, and insights into the OMPA input contained in the processing chamber 106 can be gained through analysis of these values. Note that the memory 108 is merely an abstract representation of a storage environment. The memory 108 could be comprised of actual integrated circuits (also referred to as "chips"). When executed by a controller 110, the instructions may specify how to control the other components of OMPA 100 to produce OMPA output from OMPA input in the processing chamber 106. The controller 110 may include a general purpose processor or a customized chip (referred to as an "application-specific integrated circuit" or "ASIC") that is designed specifically for OMPA 100.

Generally, OMPA 100 is able to operate on its own. Assume, for example, that OMPA 100 determines that OMPA input has been deposited into the processing chamber 106 based on measurements output by a weight sensor (also referred to as a "mass sensor"), as further discussed below. In response to such a determination, OMPA 100 may initiate processing of the OMPA input. Note, however, that the OMPA input need not necessarily be processed immediately. For example, OMPA 100 may not dry and then grind the OMPA input until a given criterion (e.g., time of day, weight of OMPA input, etc.) or combination(s) of various criteria is/are satisfied.

While OMPA 100 may be able to operate largely, if not entirely, on its own, there may be some situations where input from a user will be helpful or necessary. For example, the user may want to indicate when processing should be temporarily halted so that additional OMPA input can be added to the processing chamber 106. As another example, the user may te request that an operation be initiated or halted. For instance, the user could opt to initiate a "drying cycle" if the ambient environment is expected to be vacant, or the user could opt to halt a "grinding cycle" if the ambient environment is expected to be occupied. The various cycles of OMPA 100 are discussed in greater detail below.

As shown in FIG. 1, OMPA 100 may include a control input mechanism 112 (also referred to as a "data input mechanism" or simply "input mechanism") with which the user can interact to provide input. Examples of input mechanisms include mechanical buttons and keypads for tactile input, microphones for audible input, scanners for visual input (e.g., of machine-readable codes, such as barcodes or Quick Response codes), and the like. OMPA 100 may also include a control output mechanism 114 (also referred to as a "data output mechanism" or simply "output mechanism") for presenting information to inform the user of its status. For example, the control output mechanism 114 may indicate the current cycle (e.g., whether OMPA input is being processed, or whether product is ready for retrieval), connectivity status (e.g., whether OMPA 100 is presently connected to another electronic device via a wireless communication channel), and the like. One example of an output mechanism is a display panel comprised of light-emitting diodes (LEDs), organic LEDs, liquid crystal elements, or electrophoretic elements. In embodiments where the display panel is touch sensitive, the display panel may serve as the control input mechanism 112 and control output mechanism 114. Another example of an output mechanism is a speaker that is operable to output audible notifications (e.g., in response to a determination that the product is ready for retrieval).

Some embodiments of OMPA 100 are able to communicate with other electronic devices via wireless communication channels. For example, a user may be able to interact with OMPA 100 through a control platform (not shown) that is embodied as a computer program executing on an electronic device. The control platform is discussed in greater detail below with reference to FIG. 11. In such embodiments, OMPA 100 may include a communication module 116 that is responsible for receiving data from, or transmitting data to, the electronic device on which the control platform resides. The communication module 116 may be wireless communication circuitry that is designed to establish wireless communication channels with other electronic devices. Examples of wireless communication circuitry include chips configured for Bluetooth®, Wi-Fi®, ZigBee®, LoRa®, Thread, Near Field Communication (NFC), and the like.

OMPA 100 may include a power interface 118 (also referred to as a "power port" or "power jack") that is able to provide main power for the drying and grinding functionality, as well as power for the other components of OMPA 100, as necessary. The power interface 118 may allow OMPA 100 to be physically connected to a power source (e.g., an electrical outlet) from which power can be obtained without limitation. Alternatively, the power interface 118 may be representative of a chip that is able to wirelessly receive power from the power source. The chip may be able to receive power transmitted in accordance with the Qi standard developed by the Wireless Power Consortium or some other wireless power standard. Regardless of its form, the power interface 118 may allow power to be received from a source external to the durable housing 102. In addition to the power interface 118, OMPA 100 may include a power component 120 that can store power received at the power interface 118. The power component 118 could advantageously be useful to maintain some or all operations (e.g., the state of communications and functionality of electronic components) in the event of a power outage. Examples of power components include rechargeable lithium-ion (Li-Ion) batteries, rechargeable nickel-metal hydride (NiMH) batteries, rechargeable nickel-cadmium (NiCad) batteries, and the like.

In order to produce an OMPA output from OMPA input, OMPA 100 (and, more specifically, its controller 110) may control one or more drying mechanisms 122A-N and one or more grinding mechanisms 124A-N. The drying mechanisms 122A-N are discussed in greater detail below with reference to FIGS. 2A-4, while the grinding mechanisms 124A-N are discussed in greater detail below with reference to FIG. 6. The drying mechanisms 122A-N are responsible for desiccating the OMPA input. Desiccation may not only allow the OMPA input easier to process (e.g., grind), but also may prevent the formation of mold that thrives in humid conditions. Examples of drying mechanisms include heating elements that reduce moisture by introducing heat and fans that reduce moisture by introducing an airflow. Meanwhile, the grinding mechanisms are responsible for cutting, crushing, or otherwise separating the OMPA input into fragments. Examples of grinding mechanisms include paddles, mixers, impellers, and rotating blades (e.g., with two, three, or four prongs). Grinding mechanisms are normally comprised of a durable material, such as die cast aluminum, stainless steel, or another material that offers comparable strength and rigidity. By working in concert, the drying and grinding mechanisms 122A-N, 124A-N can convert OMPA input into a more stable product as further discussed below.

Moreover, air may be drawn from the ambient environment into the durable housing 102 and then expelled into the processing chamber 106 so as to help desiccate the OMPA input contained therein, as further discussed below with reference to FIGS. 2A-4. As shown in FIG. 1, air that is drawn from the processing chamber may be treated using one or more air treatment mechanisms 126A-N (also referred to as "air management mechanisms" or "air discharge mechanisms") before being released back into the ambient environment.

Other components may also be included in OMPA 100. For example, sensor(s) 128 may be arranged in various locations throughout OMPA 100 (e.g., along the path that the air travels through OMPA 100). The sensor(s) 128 may include a proximity sensor that is able to detect the presence of nearby individuals without any physical contact. The proximity sensor may include, for example, an emitter that is able to emit infrared (IR) light and a detector that is able to detect reflected IR light that is returned toward the proximity sensor. These types of proximity sensors are sometimes called laser imaging, detection, and ranging (LiDAR) scanners. Alternatively, the presence of an individual may be inferred based (i) whether sounds indicative of the user are detectable (e.g., by a passive microphone or an active sonar system) or (ii) whether an electronic device associated with the user is detectable (e.g., by the communication module 116).

OMPA 100 may adjust its behavior based on whether any individuals are nearby. For instance, OMPA 100 may change its operating state (or simply "state") responsive to a determination that an individual is nearby. As an example, OMPA 100 may stop driving the grinding mechanisms upon determining that someone is located nearby. Thus, OMPA 100 could intelligently react to changes in the ambient environment. Over time, outputs produced by the proximity sensor (plus other components of OMPA 100) could be used to better understand the normal schedule of individuals who frequent the physical space in which OMPA is situated.

In some embodiments, OMPA 100 includes an ambient light sensor whose output can be used to control different components. The ambient light sensor may be representative of a photodetector that is able to sense the amount of ambient light and generate, as output, values that are indicative of the sensed amount of ambient light. In embodiments where the control output mechanism 114 is a display panel, the values output by the ambient light sensor may be used by the controller 110 to adjust the brightness of the display panel.

Desiccating OMPA Input Through Airflow Generation

One core aspect of OMPA is its ability to desiccate OMPA input that is deposited into the processing chamber. By removing moisture from the OMPA input through a judicious application of heating, grinding, mixing, and airflow according to the teachings herein, the OMPA can substantially halt decomposition of the OMPA input and produce a stable mass of dried-and-grinded OMPA input (hereinafter "OMPA output" or "end product" or simply "product"). This can be accomplished by directing an airflow through the processing chamber that causes the OMPA input to become increasingly dry in a predictable manner.

FIG. 2A includes a front-side perspective view of OMPA 200 that includes a lid 204 in a closed position. FIG. 2B, meanwhile, includes a rear-side perspective view of OMPA 200 with the lid 204 in an open position. As further discussed below, the lid 204 may be pivotably connected to a durable housing 202, so as to allow a user to easily expose and then cover a processing chamber 210 located inside the durable housing 202. As described further herein, OMPA 200 can be advantageously designed and configured such that it can be placed flush up against a wall or other barrier in a space-saving manner, in that it does not require gapped separation from the wall, while at the same time maintaining the ability for good airflow in and out of OMPA 200.

As shown in FIG. 2A, the lid 204 may have one or more air ingress openings 206 (or simply "openings") through which air can be drawn from the ambient environment by a first fan (also referred to as a "turbulent fan") installed therein. Here, for example, a single opening 206 is located along a periphery of the lid 204 near a rear side of the OMPA 200. Generally, the opening(s) 206 are located near where the lid 204 is pivotably connected to the durable housing 202. Advantageously, there may be a built-in offset between a plane of the opening 206 and a backmost plane of the overall durable housing 202, whereby airflow into OMPA 200 will not be impeded even while the backmost plane is flush against a wall. However, the opening(s) 206 could be located, additionally or alternatively, elsewhere along the exterior surface of the lid 204. For example, multiple openings may be spaced along a periphery of the lid 204 to further ensure that sufficient air can be drawn into the lid 204 by the first fan even if OMPA 200 is positioned proximate to an obstacle (e.g., a wall).

As shown in FIG. 2B, this air can then be expelled toward the OMPA input through one or more openings 208 along the interior surface of the lid 204. This will create a downward airflow that causes turbulence inside the processing chamber 210, thereby increasing the rate at which the OMPA input is dried. The speed of the first fan may be roughly proportional to the speed of the downward airflow (and thus, the amount of turbulence). OMPA 200 may increase the speed of the first fan if quicker drying is desired.

Accordingly, the first fan may draw air through the opening(s) 206 in the exterior surface of the lid 204 and then blow the air downward toward the OMPA input to create a turbulent airflow (also referred to as a "turbulent airstream"). This turbulent airflow may create small vortices inside the processing chamber 210 that ensure the air continues to move across the surface of the OMPA input.

In the embodiment shown in FIG. 2B, the opening(s) 208 are centrally located along the interior surface of the lid 204. However, the opening(s) 208 could be located elsewhere along the interior surface of the lid 204. For example, the opening(s) 208 may be located along one edge of the lid 204 if the intake vent through which air is removed from the processing chamber 210 is located near an opposing edge of the lid 204.

When in operation, air can be removed from the processing chamber 210 through a used-air intake vent (not shown) in an exhaust hood that is located beneath a bezel 212. The intake vent is further discussed below with reference to FIGS. 3A-B. The bezel 212 may extend around a periphery of the durable housing 202 to "frame" the aperture through which OMPA input can be deposited in the processing chamber 210. The exhaust hood may be partially or fully obstructed when the bezel 212 is installed within the durable housing 202. Here, for example, the exhaust hood is fully obstructed by the bezel 212, and therefore cannot be easily viewed while the bezel 212 is installed within the durable housing 202.

As further discussed below, a user may need to remove the bezel 212 in order to remove the processing chamber 210 from the durable housing 202. To remove the bezel 212, the user may grasp a structural feature 220 (referred to as a "lip") that allows the bezel 212 to be readily removed by hand. The structural feature 220 may also serve other purposes. For example, the structural feature 220 may accommodate a locking mechanism 222 that extends downward from the lid 204 into the durable housing 202. After the locking mechanism 222 extends into the durable housing 202, a latch (e.g., driven by a solenoid) may secure the locking mechanism 222 in place. This may be helpful to restrict access when, for example, the OMPA 200 is operating at high intensity and contents of the processing chamber 210 are hot.

Removal of the bezel 212 may expose the exhaust hood as mentioned above. FIG. 3A includes a perspective view of OMPA 300 without its bezel to illustrate one possible location for the exhaust hood 302 that extends over a used-air intake vent. As further discussed below, the processing chamber 306 of OMPA 300 may be representative of a receptacle that can be removably installed within a cavity that is defined by an interior surface of the durable housing 308. Normally, the exhaust hood 302 is located along the interior surface such that, when the receptable is installed within the cavity, the used-air intake vent is positioned proximate to an upper end of the receptable. Said another way, the exhaust hood 302 may be positioned so that the used-air intake vent is not obstructed when the receptacle is installed within the cavity in the durable housing 308.

At a high level, the exhaust hood 302 may be designed to guide or direct air from the processing chamber 306 through the used-air intake vent for treatment and then release into the ambient environment. A filter 304 may be installed in the used-air intake vent to prevent large fragments of OMPA input or product from entering the odor treatment system. This filter 304 may be removable. Accordingly, a user may be able to remove the filter 304 (e.g., for cleaning purposes), or the user may be able to replace the filter 304.

FIG. 3B illustrates how, when the bezel 310 is installed in OMPA 300, air in the processing chamber 306 can flow underneath the bezel 310 into a space above the edge of the receptacle and then downward through the used-air intake vent. Air that is removed from the processing chamber 306 through the used-air intake vent can be routed through an odor treatment system (not shown) of OMPA 300 for treatment, as further discussed below with reference to FIG. 4A. Then, the treated air can be expelled from OMPA 300 into the ambient environment. Referring again to FIG. 2, the treated air may be expelled through one or more air egress openings (or simply "openings") located along an interior surface of a mechanical feature 214. The interior surface of the mechanical feature 214 may define a space 216 into which treated air can be expelled. As shown in FIG. 2B, the space may not be fully enclosed. Here, for example, the mechanical feature 214 is roughly in the form of an open cylinder, and thus may also serve as a handle along the exterior surface of the durable housing 202. Additionally or alternatively, opening(s) may be located along the rear surface of the durable housing 202 but oriented such that the treated air is expelled outward at an angle. For example, opening(s) may be located along one or both sides of a vertical pillar 218 (also referred to as a "spine") that runs along the rear side of OMPA 200, so that the treated air is expelled toward the sides of OMPA 200. These designs allow treated air—which may be moister than ambient air—to exit OMPA 200 without being expelled directly onto a nearby obstacle (e.g., a wall). Another benefit of these designs is that "recycling" of air is minimized by ensuring that the treated air is not expelled toward the opening 206 in the lid 204 through which air is drawn into OMPA 200. Advantageously, the vertical pillar 218 can serve multiple functions. The vertical pillar 218 may not only serve as a mechanical offset that allows OMPA 200 to be placed adjacent to obstacles without obstructing incoming and outgoing airflow, but may also function as a plenum by providing a pathway along which air can travel while inside the durable housing 202. Moreover, the vertical pillar can act as an anti-tipping mechanism by providing stability.

Figure 4A:
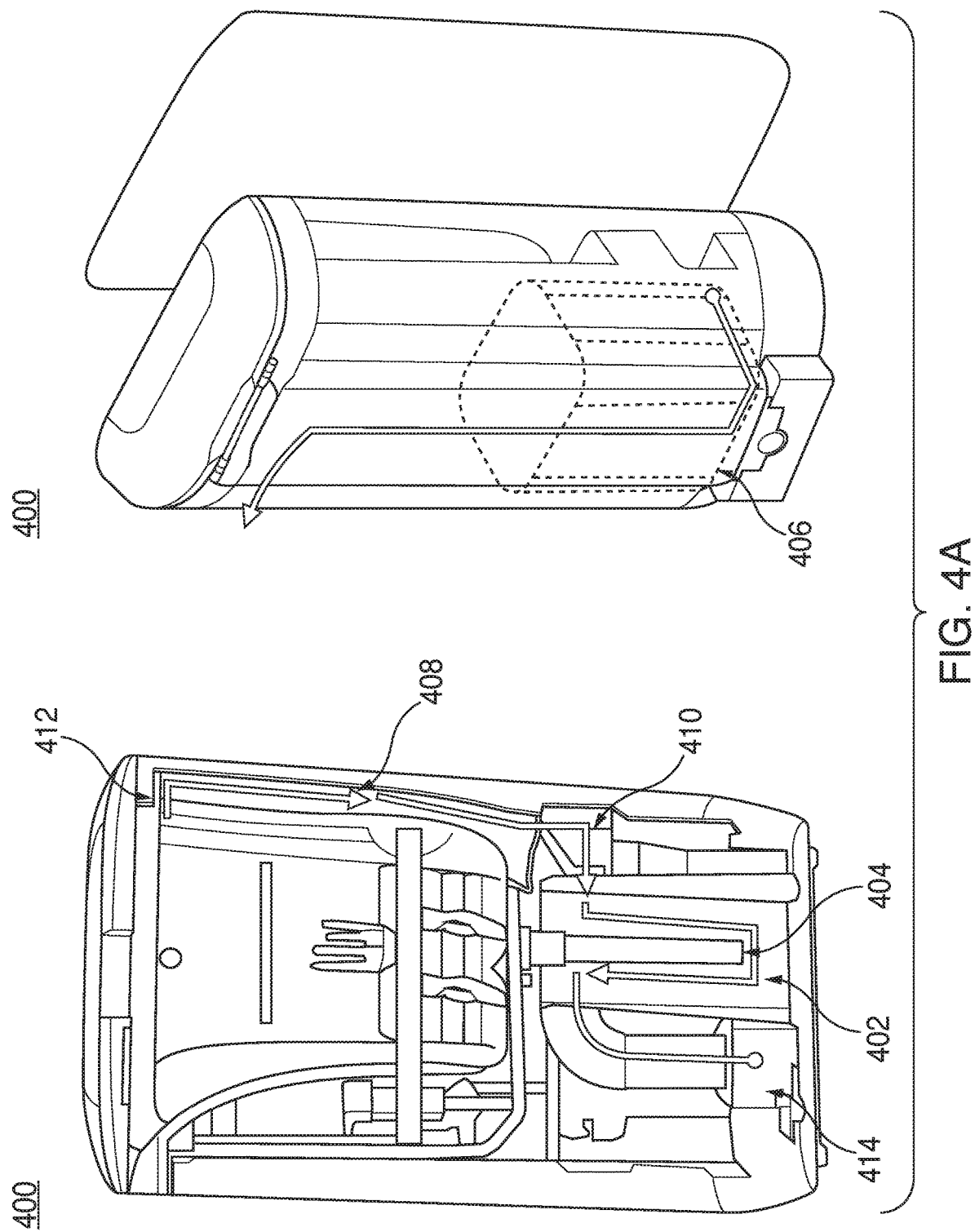
FIG. 4A includes isometric front and rear perspective views of an organic matter processing apparatus where the durable housing is transparent to show additional details according to embodiment.

FIG. 4A includes isometric front and rear perspective views of OMPA 400 where the durable housing is transparent to show additional details. In FIG. 4A, a trace is shown to indicate the route that air drawn from the processing chamber (e.g., through the exhaust hood 302 of FIG. 3) traverses before exiting OMPA 400. There are two main chambers through which the air is guided as it traverses the route.

First, the air is guided through a photolysis chamber 402. In the photolysis chamber 402, the air is exposed to light emitted by a light source 404 that is meant to cause the decomposition or separation of odor-causing molecules. The light source 404 may be, for example, an ultraviolet (UV) bulb or UV light-emitting diode (LED).

Second, the air is guided through a dry media chamber 406. In the dry media chamber 406, the air is exposed to dry media that is meant to trap odor-causing molecules through a process referred to as adsorption. Examples of dry media include charcoal, coconut shell carbon, and manganese dioxide. In addition to acting as an odor destructor, the dry media may also act as an ozone destructor. Ozone may be generated by the light source 404 in the photolysis chamber 402, and the dry media may help to destroy that ozone.

In some embodiments, the durable housing includes a pivotable door that permits access to the dry media chamber 406. By opening the pivotable door, a user may be able to easily replace the dry media in the dry media chamber 406. For example, the user may remove existing canisters and then reinstall new canisters that have loose granules, disks, or other particulates of the dry media stored therein. Such a design allows the dry media to be replaced whenever necessary.

Following treatment in the dry media chamber 406, the air may rise upward through the vertical pillar along the rear side of the OMPA 400 that acts as a plenum. Then, the air can be expelled into the ambient environment through opening(s) located near the upper end of the vertical pillar as discussed above with reference to FIG. 2B.

Accordingly, air may initially be drawn through a used-air intake vent 412 into a channel 408 by a second fan 410 (also referred to as a "blower fan") that is located in or near the channel 408. The used-air intake vent 412 is the same used-air intake vent as mentioned above with reference to FIGS. 2-3. The air can then be directed into the photolysis chamber 402. Air leaving the photolysis chamber 402 can be directed into the dry media chamber 406. In some embodiments, the air is heated by a heater 414 before it enters the dry media chamber 406 in order to decrease moisture. This may help lengthen the lifespan of the dry media in the dry media chamber 406. After the air has been treated in the photolysis and dry media chambers 402, 406—which collectively represent the odor treatment system—the air can be guided upward through the vertical pillar that acts as a plenum, and then the air can be expelled into the ambient environment. As mentioned above, the air could be expelled through opening(s) along the rear surface of the durable housing.

The first fan included in the lid of OMPA 400 and the second fan 410 situated in the odor treatment system of the OMPA 400 may have variable speeds. Accordingly, a controller (e.g., controller 110 of FIG. 1) may be able to easily change the speed of the first and second fans. However, to ensure that air is drawn through the used-air intake vent 412, the second fan 410 may be driven at a higher speed than the first fan. Driving the second fan 410 at a higher speed than the first fan will result in a pressure differential that causes air to be advantageously drawn through the used-air intake vent 412.

Figure 4B:
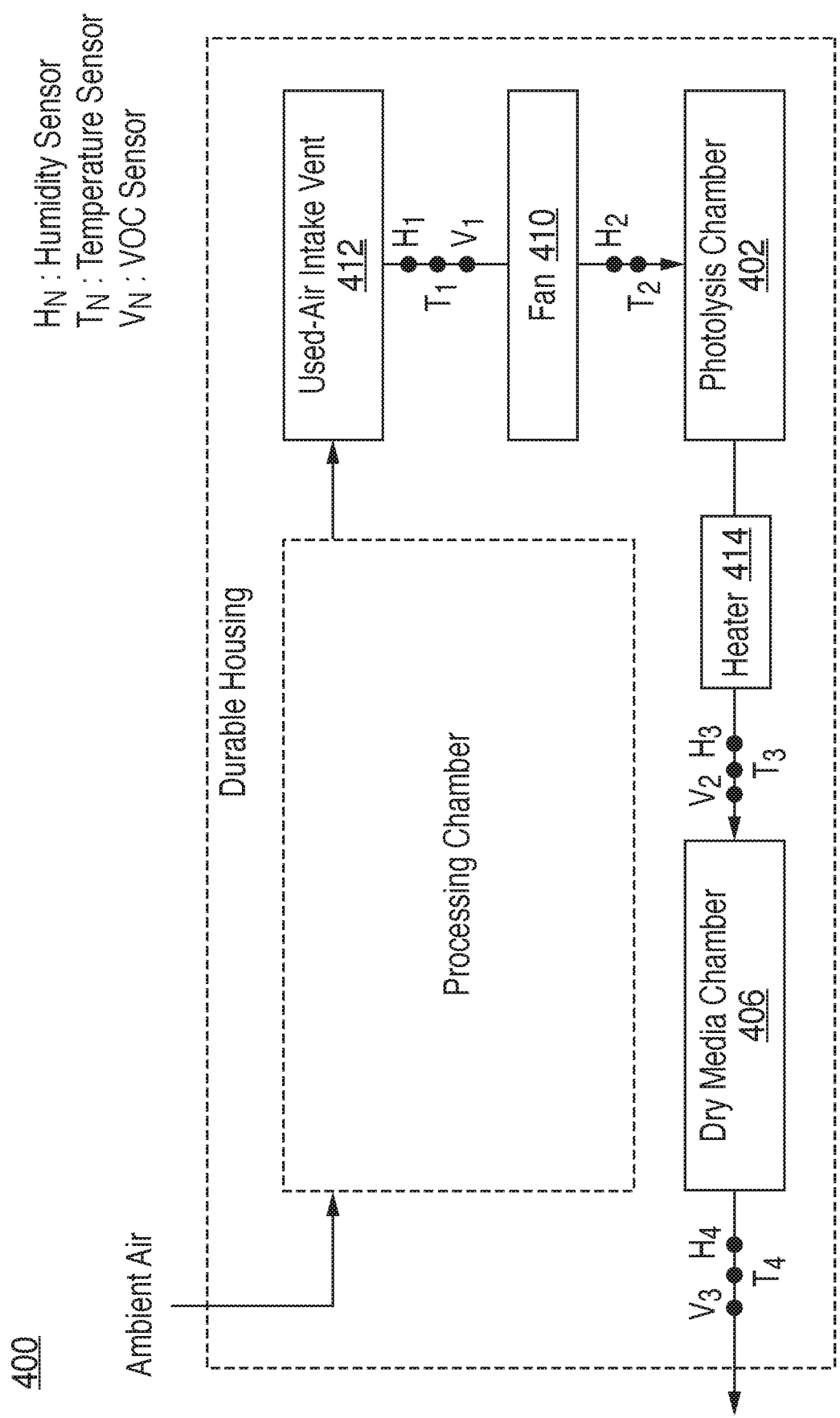
FIG. 4B includes a conceptual diagram that identifies possible locations for different types of sensors according to embodiment.

In order to gain insights in the nature of the air as it travels through OMPA 400, one or more sensors may be located along the route indicated by the trace. FIG. 4B includes a conceptual diagram that identifies possible locations for different types of sensors. Note that the selection and placement of sensors in FIG. 4B is provided for the purpose of illustration, and some or all of these sensors could be included in OMPA 400. For example, sensors able to measure temperature and humidity may be located proximate to the intake vent 412, the entry of the photolysis chamber 402, the channel interconnected between the photolysis and dry media chambers 402, 406, the exit of the dry media chamber 406, or any combination thereof. As another example, a sensor able to measure ozone may be located in the channel 408 leading to the photolysis chamber 402 and/or the channel interconnected between the photolysis and dry media chambers 402, 406. As another example, a sensor able to measure volatile organic compounds (VOCs) may be located along the route. If the VOC sensor is located before the photolysis chamber 402, its measurements may be used to monitor variations in odor across the lifetime of the OMPA 400. Meanwhile, if the VOC sensor is located after the photolysis chamber 402, its measurements may be used to determine the degree to which the dry media chamber 406 is responsible for destroying odor. Said another way, measurements produced by a VOC sensor located after the photolysis chamber 402 could be a useful indicator of the expected lifetime of the dry media in the dry media chamber 406. Other measurement dimensions that may be monitored by sensor(s) include carbon dioxide (CO2), carbon monoxide (CO), dioxygen (O2), hydrogen sulfide (H2S), nitrogen dioxide (NO2), potential of hydrogen (pH), and salinity.

Because the sensors are located along the route indicated by the trace, the odor treatment system may be able to operate as a closed loop system. The term "closed loop system," as used herein, is meant to describe a system that is able to dynamically adjust its activities based on feedback to achieve a desired goal. For instance, measurements generated by VOC sensors located along the route indicated by the trace may influence how a controller (e.g., the controller 110 of FIG. 1) controls different components of the OMPA 400. As an example, if measurements generated by a VOC sensor (e.g., V2 or V3 in FIG. 4B) located after the photolysis chamber 402 indicate that the air still has a relatively high concentration of an undesired gas, then the controller may adjust the speed of the second fan 410 so as to change the amount of time that the air remains in the photolysis and dry media chambers 402, 406. The measurements generated by VOC sensors could also be used to infer the condition of the photolysis and dry media chambers 402, 406. Assume, for example, that a VOC sensor is located between the photolysis chamber 402 and dry media chamber 406 as shown in FIG. 4B. In such a scenario, measurements generated by the VOC sensor may be used to predict the state of the dry media included in the dry media chamber 406. Said another way, measurements generated by the VOC sensor may be used to infer the amount of undesired gasses to which the dry media contained in the dry media chamber 406 has been exposed. Rather than simply instruct a user to replace the dry media on a periodic basis (e.g., every month, two months, or three months), an OMPA could instead intelligently indicate when replacement is necessary based on an analysis of measurements generated by the VOC sensor.

While sensors could be located at various positions along the route, sensors generally should not be installed in the photolysis chamber 402. As mentioned above, the light source 402 located in the photolysis chamber 402 may generate ozone as it emits light. This ozone can have a significant oxidative effect on various sensors. As such, sensors are generally not installed in the photolysis chamber 402.

One or more sensors could also be installed inside the processing chamber, for example, to measure characteristics of the air above the OMPA input (i.e., air in the "headspace" of the processing chamber), For example, sensors could be located along the interior surface of the lid, or sensors could be located along the interior surface of the processing chamber.

Additional sensors could also be located along the route indicated by the trace shown in FIG. 4A. For example, OMPA 400 may include a tachometer that measures the rotation speed of the shift of the second fan 410. Values output by the tachometer may be used (e.g., by the controller 110 of FIG. 1) to predict the speed at which the airflow is traveling through the OMPA 400, and therefore how to control other components (e.g., the drying and grinding mechanisms 122A-N, 124A-N of FIG. 1) of OMPA 400. Additionally or alternatively, OMPA 400 may include a dedicated sensor that is responsible for measuring the speed of the airflow, either directly or indirectly. For example, a hot wire anemometer may be situated along the route within the airflow. The hot wire anemometer may be electrically heated to some temperature above the ambient temperature. The airflow will cool the wire, and the speed of the airflow can be inferred based on the decrease in temperature. As another example, a pressure sensor may be situated along the route within the airflow. As the airflow contacts the pressure sensor, values indicative of the total force may be produced. The speed of the airflow can be inferred based on these values.

Practical Processing Chamber

Figure 5:
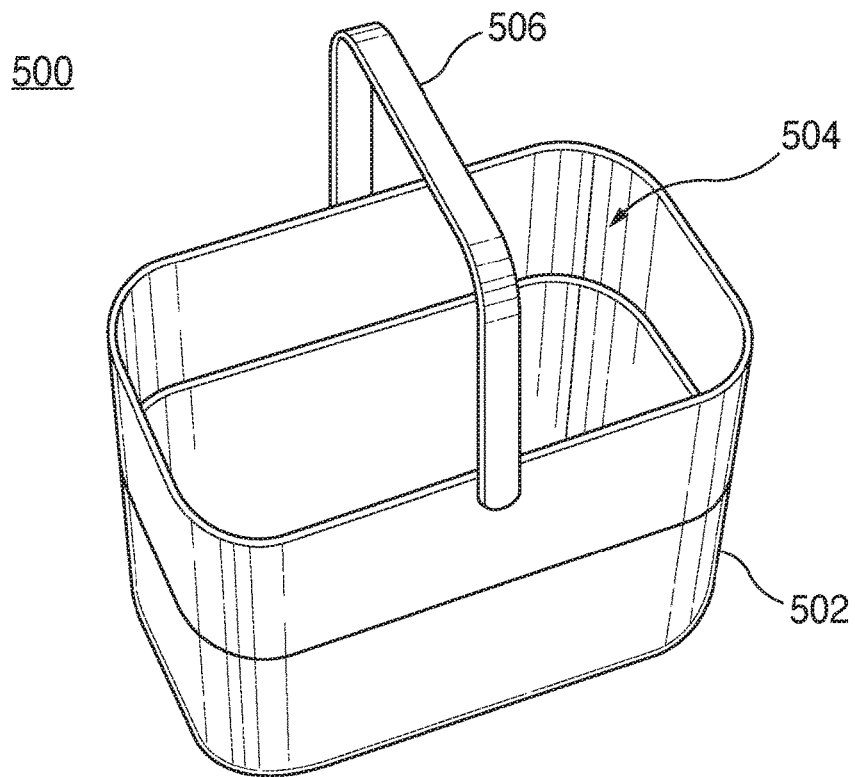
FIG. 5 includes a perspective view of a processing chamber that comprises a receptacle (also referred to as a "bucket") designed to fit securely within the durable housing of an organic matter processing apparatus according to embodiment.

Another core aspect of the OMPA is providing a processing chamber that not only allows OMPA input to be processed in a consistent, predictable manner, but is also easy to use by various individuals. FIG. 5 includes a perspective view of a processing chamber 500 that comprises a receptacle 502 (also referred to as a "bucket") designed to fit securely within the durable housing of an OMPA. The bucket 502 is preferably user-removable from the durable housing, so as to allow for easier integration into existing workflows. For example, the bucket 502 may be placed on the counter during food preparation and then reinstalled in the durable housing afterwards. As another example, the bucket 502 may be removed from the durable housing after production of the product is complete to allow for easier handling (e.g., disposal, storage, or use) of the product.

Generally, the bucket 502 is designed so that, when installed in the durable housing, OMPA input can be easily deposited by simply opening the lid of the OMPA. Normally, the bucket 502 includes an aperture 504 along its top end that is sized to allow for various forms of OMPA input. In some embodiments, the aperture 504 has a rectangular form that is 200-500 millimeters (mm) (7.87-19.68 inches) in length and 150-300 mm (5.90-11.81) in width. For example, the aperture 504 may have a length of roughly 350 mm (13.78 inches) and a width of roughly 200 mm (7.87 inches). Meanwhile, the bucket 502 may have a roughly prismatic form with a length of 250-500 mm (9.84-19.68 inches), a width of 100-300 mm (3.94-11.81 inches), and a height of 150-350 mm (5.90-13.78 inches). For example, the bucket 502 may have a length of roughly 320 mm (12.60 inches), a width of roughly 195 mm (7.68 inches), and a height of roughly 250 mm (9.84 inches).

Moreover, the bucket 502 may be designed to be easily washable (e.g., in a dishwasher). Thus, the bucket 502 may be comprised of one or more durable materials that can withstand prolonged exposure to OMPA input in various states (e.g., moist and dry), as well as repeated washings. Examples of durable materials include plastics, ceramics, metals, and biocomposites. The term "biocomposite," as used herein, may refer to a composite material formed by a matrix (e.g., of resin) and a reinforcement of natural fibers. Biocomposites may be well suited because the matrix can be formed with polymers derived from renewable resources. For example, fibers may be derived from crops (e.g., cotton, flax, or hemp), wood, paper, and the like. This makes biocomposites an attractive option since the benefits (e.g., a focus on renewability and recyclability) align with those offered by the OMPA.

As shown in FIG. 5, a handle 506 may be pivotably connected to opposing sides of the bucket 502. Such a design allows the handle 506 to be pivoted downward when the bucket 502 is installed in the structural body of the OMPA. This can be seen in FIG. 2A, where the handle is folded downward to accommodate a bezel. Thus, the handle 506 may be designed so as to not impede the deposition of OMPA input into the bucket 502. The handle 506 may be designed to allow a user to easily carry the entire processing chamber 500, with either one or two hands. To ensure that the processing chamber 500 can be transported without issue, the bucket 502 may be designed so that, when loaded with product, the weight does not exceed a threshold. The threshold may depend on the size of the bucket 502 and/or the material(s) from which the bucket 502 is made, though it may be desirable to limit the weight to no more than 10-25 pounds (and preferably 15-20 pounds).

Figure 6:
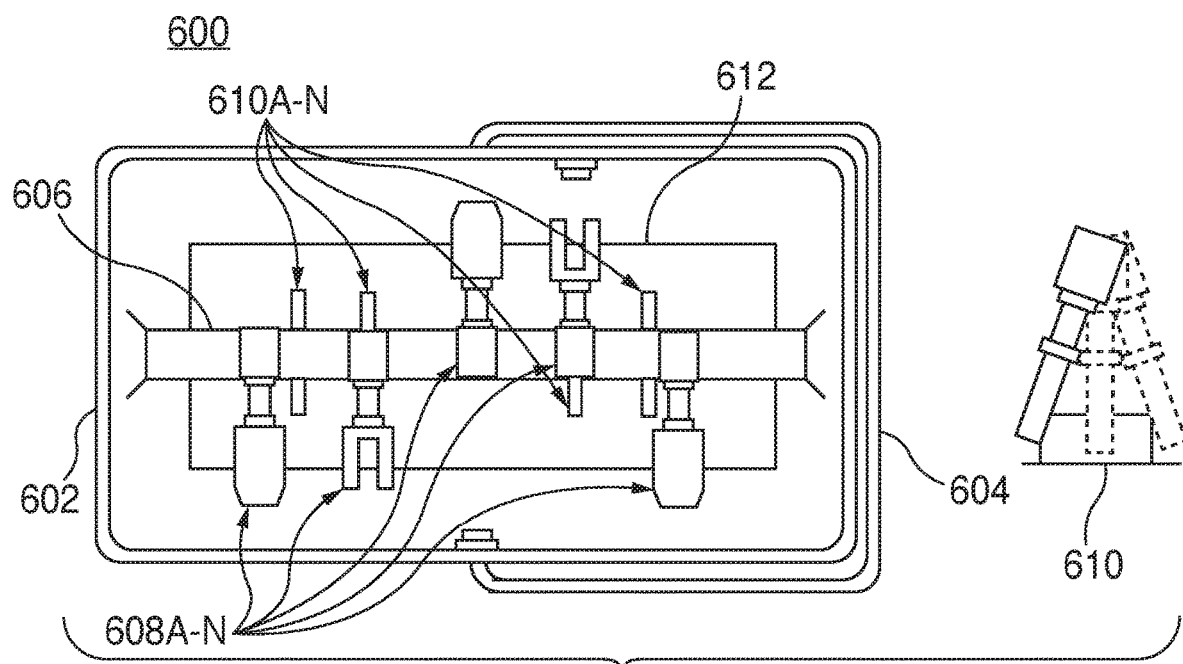
FIG. 6 includes a top view of a processing chamber that includes a bucket with a handle pivotably connected thereto according to embodiment.

FIG. 6 includes a top view of a processing chamber 600 that includes a bucket 602 with a handle 604 pivotably connected thereto. As mentioned above, an OMPA may include one or more grinding mechanisms 608A-N that are responsible for cutting, crushing, or otherwise separating OMPA input deposited into the bucket 602 into fragments. The grinding mechanisms 608A-N may be part of the processing chamber 600 as shown in FIG. 6. Here, for example, five grinding mechanisms are fixedly attached to a central rod 606 that is arranged horizontally across the width of the bucket 602 and is driven by gears (not shown), which are in turn driven by a motor (not shown). The motor may be located in the durable housing, while the gears may be located in the bucket 602 as further discussed with reference to FIG. 7.

The grinding mechanisms 608A-N can be driven in such a manner that an appropriate amount of grinding occurs. In some embodiments, the appropriate amount of grinding is predetermined (e.g., programmed in memory of the OMPA). In other embodiments, the appropriate amount of grinding is determined dynamically based on a characteristic of OMPA input in the bucket 602. For example, the appropriate amount of grinding may be based on the amount of OMPA input (e.g., as determined based on measurements output by a mass sensor) contained in the bucket 602. As another example, the appropriate amount of grinding may be based on the amount of resistance that is experienced by the grinding mechanisms 608A-N. Generally, dried OMPA input that has been at least partially ground will offer less resistance than wet OMPA input or dried OMPA input that has not been ground.

As the central rod 606 rotates, the grinding mechanisms 608A-N may also rotate. Generally, the grinding mechanisms rotate at a rate of 1-10 rotations per minute (RPM), at a rate of 1-2 RPMs, or 1.6 RPMS. This rotating action may cause OMPA input located near the bottom of the bucket 602 to be brought toward the top of the bucket 602, such that all OMPA input contained in the bucket 602 is occasionally exposed to the downward airflow emitted from the lid.

The grinding mechanisms 608A-N may not provide sufficient shear on their own to break apart more solid OMPA input. Examples of solid OMPA input include bones, raw produce, and the like. To address this issue, the bucket 602 may include one or more stationary blades 610A-N that can work in concert with some or all of the grinding mechanisms 608A-N. Assume, for example, that the processing chamber 600 includes at least one paddle and at least one two-prong rotating blade. In FIG. 6, the processing chamber 600 includes three paddles and two two-prong rotating blades that are alternately arranged along the length of the central rod 606. In such an embodiment, the stationary blades 610A-N may be positioned so that as each two-prong rotating blade rotates, a corresponding stationary blade will pass through its two prongs to create cutting action. A side view of this scenario is shown in FIG. 6. Paddles may also create some cutting action. However, paddles may create less cutting action than the two-prong rotating blades since (i) the paddles are generally oriented at an angle to promote upward and sideward movement of OMPA input and (ii) the paddles generally pass alongside the stationary blades 610, thereby providing less shear.

Generally, more than one type of grinding mechanism is included in the processing chamber 600. For example, paddles and rotating blades could be arranged in an alternating pattern across the width of the bucket 602 so provide different functionalities. While the paddles may have limited usefulness in terms of grinding OMPA input, the paddles may be useful in churning OMPA input so that wetter material rises toward the top of the bucket 602. Accordingly, some "grinding mechanisms" may be primarily responsible for cutting OMPA input into smaller fragments while other "grinding mechanisms" may be primarily responsible for mixing the OMPA input to promote desiccation.

In FIG. 6, the paddles and rotating blades are shown to be coplanar—though extending from opposing sides of the central rod 606—for the purpose of illustration. The grinding mechanisms 608A-N could be radially arranged about the periphery of the central rod 606 in different ways. For example, the three paddles shown in FIG. 6 could be equally spaced about the circumference of the central rod 606 to ensure that OMPA input contained in the bucket 602 is constantly, or nearly constantly, jostled. Generally, the two-prong rotating blades are offset to minimize the torque that is needed to cut through OMPA input at any given point in time. Said another way, the two-prong rotating blades may be offset so that only one is actively cutting OMPA input in conjunction with its corresponding stationary blade 610 at a time. Here, for example, the two two-prong rotating blades are offset by 180 degrees, though the blades could be offset by more or less than 180 degrees.

Grinding mechanisms (and the power available to those grinding mechanisms) may govern the types of OMPA input that can be handled by a given OMPA. Generally, stronger grinding mechanisms in combination with more power will allow heavier duty OMPA input (e.g., bones) to be handled without issue. Accordingly, different embodiments of OMPA could be designed for residential environments (e.g., with less power and weaker grinding mechanisms) and commercial environments (e.g., with more power and stronger grinding mechanisms).

In some embodiments, the bucket 602 includes a thermally conductive base portion 612 that is responsible for conveying heat to the OMPA input. Normally, the thermally conductive base portion 612 may extend up the longitudinal sidewalls of the bucket 602 that are parallel to the central rod 606. In embodiments where the thermally conductive base portion 612 is responsible for heating the OMPA input, the thermally conductive base portion 612 may extend up the longitudinal sidewalls roughly 40-70 percent of their height. In embodiments where the thermally conductive base portion 612 is responsible for heating the OMPA input and air in the "headspace" of the processing chamber 600, the thermally conductive base portion 612 may extend up the longitudinal sidewalls roughly 70-90 percent of their height.

Figure 7:
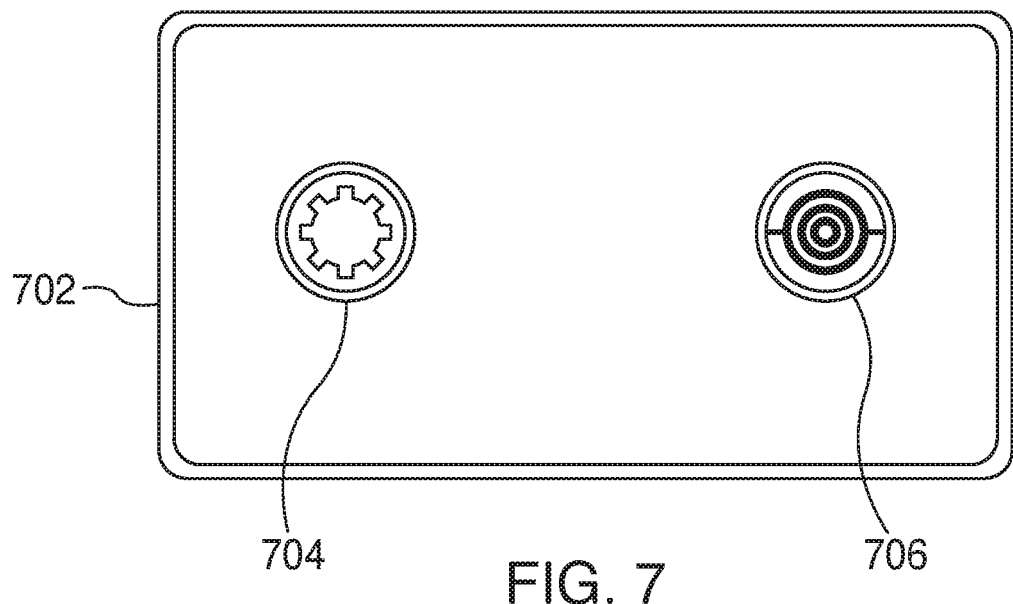
FIG. 7 includes a top view of a cavity in a durable housing that includes a mechanical coupling and an electrical coupling according to embodiment.

When the bucket 602 is installed within the durable housing, the thermally conductive base portion 612 may be electrically connected to a heating element (e.g., a resistive heating element in the form of a coil) that is located in the durable housing. FIG. 7 includes a top view of a cavity in a durable housing 702 that includes a mechanical coupling 704 and an electrical coupling 706. When installed within the cavity in the durable housing 702, the processing chamber 600 may be connected to the mechanical and electrical couplings 704, 706. Thus, the mechanical and electrical couplings 704 may be detachably connectable to respective interconnects on the processing chamber 600. The mechanical coupling 704 may be responsible for driving gears that are located in the bucket 602, while the electrical coupling 706 may be responsible for providing electricity to a heating element (not shown) that heats the thermally conductive base portion 612. The heating element may be part of the bucket 602. In some embodiments, the heating element is included in the cavity of the durable housing 702. In such embodiments, the thermally conductive base portion 612 of the bucket 602 may be heated through contact with the heating element. Accordingly, the thermally conductive base portion 612 may be heated through thermo-mechanical conductive heating or on-bucket electrical heating instead of convective heating.

A mass sensing system may be incorporated into the OMPA so that mass measurements can be made throughout an organic matter processing cycle or anytime the bucket is present within the OMPA. The mass sensing system may include one or more mass sensors such as, for example, piezoelectric mass sensors. Alternatively, the mass sensing system may include a strain gauge mass sensor.

One or more mass sensors are normally located along the bottom of the OMPA (e.g., on each "foot" where the OMPA terminates along a substantially planar level). These mass sensor(s) can be used to measure the weight of the OMPA (and thus, the weight of contents of the processing chamber). However, because the bucket 602 can be removable installed within the durable housing, mass sensors could additionally or alternatively be located along the bottom of the bucket 602. As an example, a mass sensor may be located on each "foot" of the bucket 602. Regardless of location, the mass sensor(s) included in the OMPA may continually or periodically output measurements that can be used to calculate, infer, or otherwise establish the total weight of the bucket 602 (including any OMPA input stored therein). These measurements can be communicated to a controller (e.g., controller 110 of FIG. 1). The controller may determine how to control other components of the OMPA (e.g., its drying and grinding mechanisms) based on these measurements. For example, the controller may determine how long to perform high intensity processing based on the rate at which the weight lessens due to loss of moisture. Mass sensing may play an important role in ensuring that the OMPA can dynamically react to changes in the state of the OMPA input.

Figure 8:
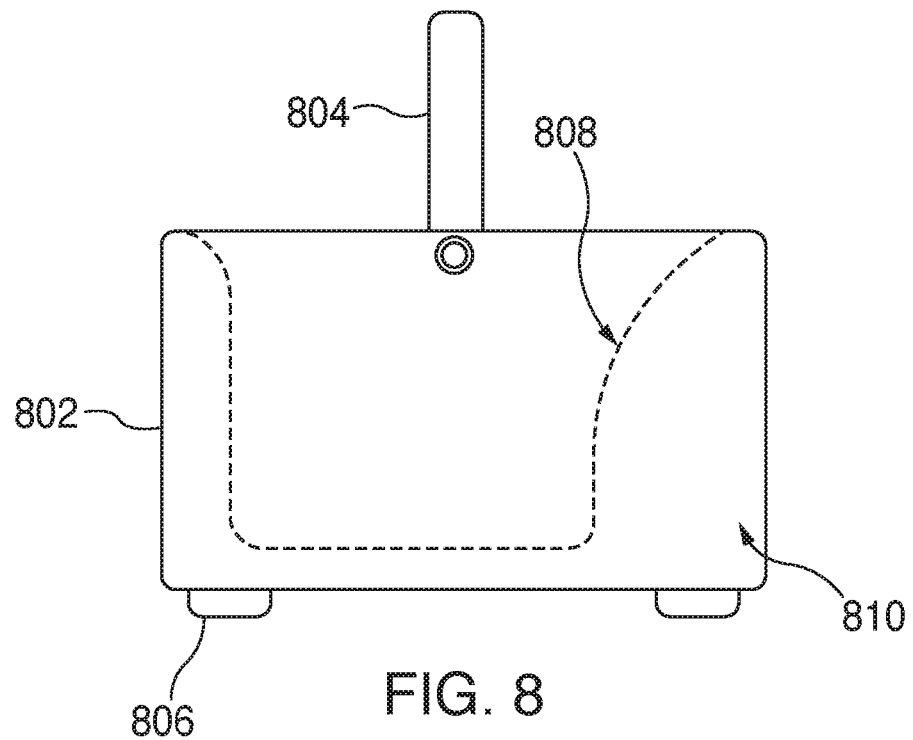
FIG. 8 includes a side profile view of a bucket in which organic matter can be deposited according to embodiment.

FIG. 8 includes a side profile view of a bucket 802 in which OMPA input can be deposited. A handle 804 may be pivotably connected to opposing sides of the bucket 802. The handle 804 may allow the bucket 802 to be easily removed from the OMPA as discussed above, as well as easily conveyed to another location. The bucket 802 may also have structural features 806 that terminate along a substantially planar level. These structural features 806 (also referred to as "feet") may help stabilize the bucket 802. Moreover, these structural features 806 may include the corresponding interconnects for the mechanical and electrical couplings 704, 706 discussed above with reference to FIG. 7. Such a design not only allows the corresponding interconnects to be readily aligned with those couplings, but also ensures that the structural features 806 can protect the corresponding interconnects when the bucket 802 is removed from the OMPA. As mentioned above, while mass sensor(s) are normally installed along the bottom of the OMPA in which the bucket 802 is to be installed, mass sensor(s) could additionally or alternatively be installed within some or all of these structural features 806 to measure the weight of the bucket 802 and its contents.

As shown in FIG. 8, the cavity defined by the interior surface of the bucket 802 may not necessarily by symmetrical across the longitudinal and latitudinal planes defined therethrough. For reference, the term "latitudinal plane" may be used to refer to the plane that is substantially parallel to the handle 804 while extended upward as shown. Meanwhile, the term "longitudinal plane" may be used to refer to the plane that is substantially orthogonal to the latitudinal plane. For example, the cavity may be more gradually tapered along one end to form a lip 808 (also referred to as a "spout"). The spout may allow a user to empty contents from the bucket 802 by simply tipping it along one end.

This gradual tapering along one end may also create a space 810 along one end of the bucket 802 in which components can be installed. For example, the gears that are responsible for driving the central rod that extends through the cavity may be located in this space 810. In addition to conserving valuable space within the bucket 802 (and OMPA as a whole), locating the gears in the space 810 will also add weight to one end of the bucket 802. This added weight may make it easier for the user to rotate the bucket 802 along that end to empty contents via the lip 808.

Practical Lid

An important aspect of increasing adoption is that the OMPA should be easily deployable and operable. The component with which many users will interact most frequently is the lid (e.g., lid 204 of FIG. 2). Accordingly, it is important that the lid be easy to use but also offer some functionality.

Figure 9:
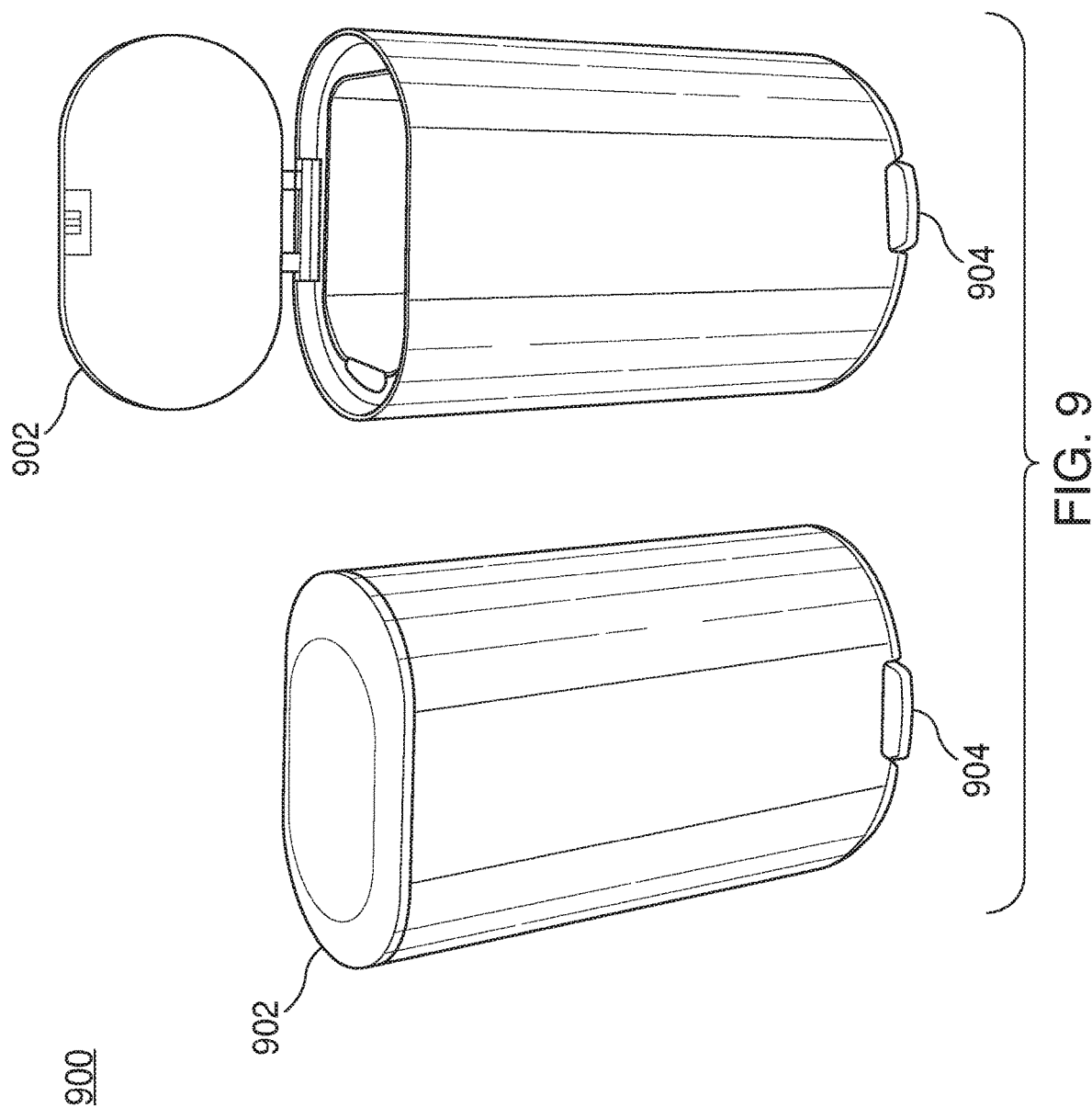
FIG. 9 includes front perspective views of an organic matter processing apparatus with the lid in a closed position and an open position according to embodiment.

As an example, a user may not only be able to open the lid with her hands, but also by interacting with an electro-mechanical pedal switch that is accessible along the front side of the OMPA. FIG. 9 includes front perspective views of OMPA 900 with the lid 902 in a closed position and an open position. As shown in FIG. 9, an electro-mechanical pedal switch 904 (or simply "pedal switch") may be located along the front side of OMPA 900. When a user applies pressure to the pedal switch 904 (e.g., with her foot), the lid 902 may be electro-mechanically actuated to the open position. As further discussed below, the open position may be one of multiple open positions to which the lid 902 can be actuated. When the user stops applying pressure to the pedal switch 904, the lid 902 may automatically close. The lid 902 may not close immediately, however. Instead, the lid 902 may be electro-mechanically actuated to the closed position a short interval of time (e.g., several seconds). Thus, the pedal switch 904 may allow the lid 902 of the OMPA 900 to be partially, if not entirely, operated in a hands-free manner.

As another example, the lid may be controllably lockable, for example, via a damped mechanism with a smooth spring-loaded retraction. Assume, for example, that the OMPA is performing high intensity processing where the processing chamber is heated. In such a situation, the lid may remain locked so long as the temperature of the processing chamber (or its contents) remains above a threshold (e.g., programmed in memory). This locking action may serve as a safety mechanism by ensuring that a user cannot easily access the interior of the OMPA under unsafe conditions. Note, however, that the user may still be able to override this locking action (e.g., by interacting with an input mechanism accessible along the exterior of the OMPA).

As another example, air may be "sucked" downward whenever the lid is opened, thereby preventing odors from escaping into the ambient environment. This action may be particularly helpful in preventing odors from escaping the OMPA when the lid is opened mid-cycle (i.e., while the OMPA input is being dried or ground). This action can be initiated by a controller based on one or more outputs produced by a sensor that is located proximate to where the lid contacts the durable housing when in the closed position. For example, a sensor could be located along the periphery of the lid, and its output may be indicative of whether the lid is adjacent to the durable housing (i.e., in the closed position). As another example, a sensor could be located along the periphery of the durable housing, and its output may be indicative of whether the lid is adjacent to the durable housing (i.e., in the closed position).

As another example, the lid may be intelligently controlled based on the intent of a user as inferred by the OMPA. Assume, for example, that the user either partially opens the lid by pivoting the lid roughly 30-75 degrees with respect to its original location or softly presses on a pedal switch (e.g., pedal switch 904 of FIG. 9). In such a situation, the OMPA may infer that the user is interested in performing a short-duration activity and then actuate the lid to a first angle (e.g., 60 degrees or 75 degrees). Examples of short-duration activities include depositing more OMPA input in the processing chamber or observing the OMPA input in the processing chamber. Now, assume that the user either fully opens the lid by pivoting the lid roughly 90 degrees with respect to its original location or firmly presses on the pedal switch. In such a situation, the OMPA may infer that the user is interested in performing a long-duration activity and then actuate the lid to a second angle (e.g., 90 degrees). Examples of long-duration activities include removing the processing chamber and cleaning the interior of the OMPA. Similarly, if the lid is actuated to the first angle and the OMPA then infers that the user is likely interested in performing a long-duration activity (e.g., based on removal of the bezel), then the lid may be actuated to the second angle. Accordingly, the OMPA may automatically further open the lid responsive to a determination that the user intends to access the interior for a longer period of time.

Similarly, the OMPA may control how quickly the lid closes based on the intent of the user. If the OMPA infers that the user is interested in performing a short-duration activity, the OMPA may maintain the lid in a given position (e.g., at the first angle) for a first amount of time. If the OMPA infers that the user is interested in performing a long-duration activity, the OMPA may maintain the lid in another given position (e.g., at the second angle) for a second amount of time. The first amount of time may be 2-10 seconds, while the second amount of time may be 10-60 seconds.

Overview of Operating States

Figure 10:
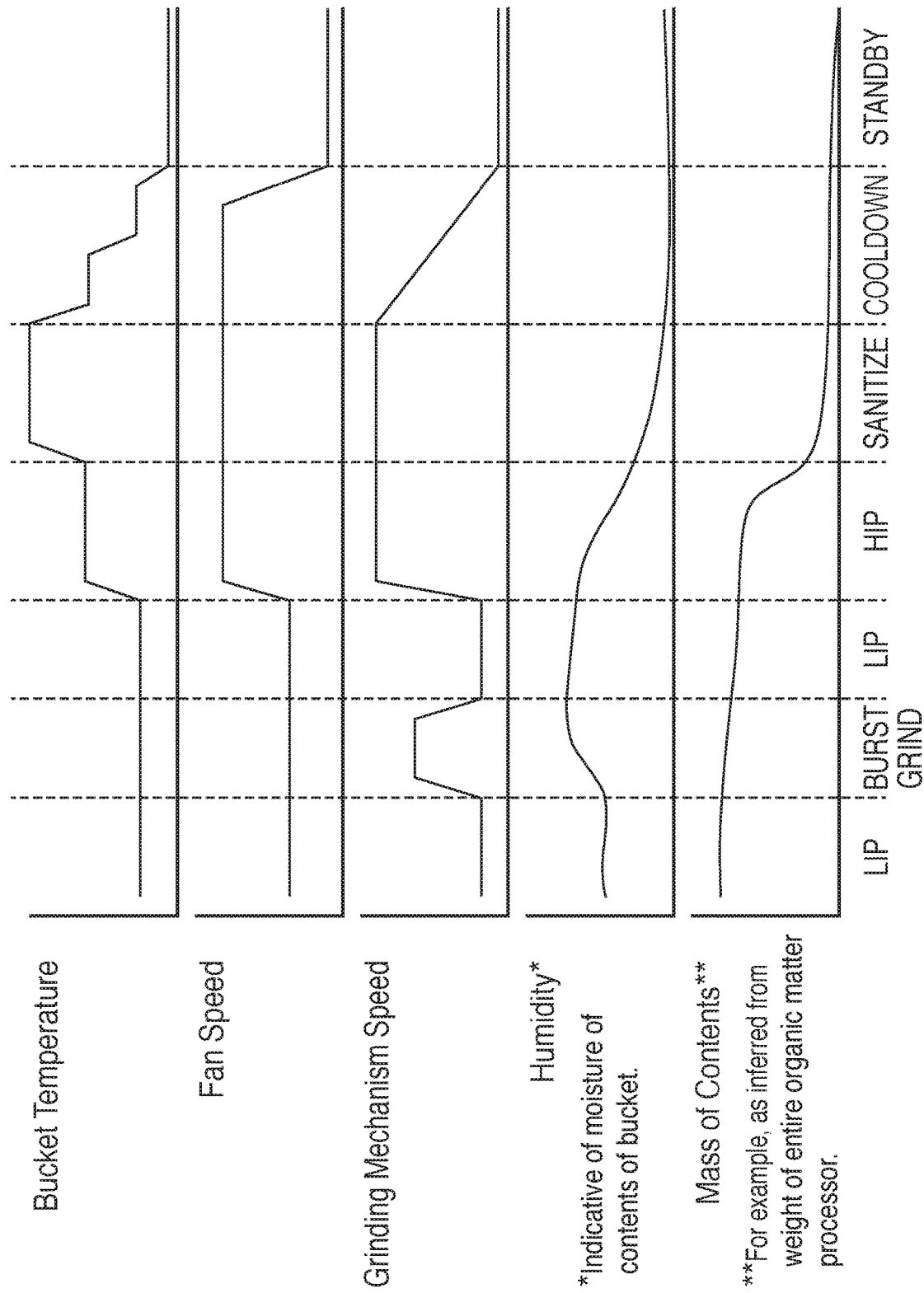
FIG. 10 includes an example of an operating diagram that illustrates how control parameters can be dynamically computed in accordance with an intelligent time recipe in order to process the contents of an organic matter processing apparatus according to embodiment.

Over time, the OMPA may cycle between various states to process OMPA input. As mentioned above, the OMPA may be able to convert OMPA input into a relatively stable product (e.g., food grounds) by drying and grinding the OMPA input. The control parameters for drying or grinding the OMPA input may be dynamically computed (e.g., by the controller 110 of FIG. 1) as a function of the outputs produced by sensors tasked with monitoring characteristics of the air traveling through the OMPA, as well as the mass or weight of the OMPA input in the processing chamber. For example, the control parameters could be dynamically computed as a function of (i) humidity of the air traveling through the OMPA, (ii) temperature of the air traveling through the OMPA, and (iii) weight of OMPA input contained in the OMPA. FIG. 10 includes an example of an operating diagram that illustrates how control parameters can be dynamically computed in accordance with an intelligent time recipe in order to process the contents of an OMPA.

As mentioned above, the OMPA may be able to intelligently cycle between different states to process OMPA input. Six different states are described in Table I. Those skilled in the art will recognize, however, that embodiments of the OMPA may be able to cycle between any number of these states. For example, some OMPAs may only be able to cycle between two, three, or four of these states, while other OMPAs may be able to cycle between all six states.

The OMPA may rely on a single target criterion or multiple target criteria to determine when to cycle between these states. The target criteria could be programmed into the memory of the OMPA, or the target criteria could be specified by a user (e.g., through an interface generated by a control platform). Examples of target criteria include moisture level, temperature, and weight. Using moisture level as an example, there may be multiple preset moisture levels (e.g., 10, 20, 30, and 40 percent) from which the target criterion could be selected (e.g., based on the nature of the OMPA input). The OMPA may not measure moisture of the OMPA input, but can instead predict or infer the moisture based on, for example, the humidity of air traveling through the OMPA and the weight of OMPA input. The OMPA could also rely on the average times for completion of these states.

Assume, for example, that the OMPA receives input indicative of a request to process OMPA input deposited into the processing chamber. In such a situation, the OMPA may determine when to schedule the various states based on (i) how long those states have historically taken to complete and (ii) the weight of the OMPA input, among other factors. For example, the OMPA may attempt to schedule high intensity processing to be completed overnight as the grinding mechanisms may operate at a noise that might disturb nearby individuals.

TABLE I

Descriptions of states for processing OMPA input.

| State Identifier (ID) | State Description |
| --- | --- |
| High Intensity Processing (HIP) | Goal: Achieve the target moisture level at a given temperature.<br>Details: Temperature, airflow, and/or grinding mechanisms can be set to high settings. HIP normally takes at least several hours to complete, so the OMPA may attempt to schedule overnight. HIP may be triggered manually (e.g., via an interaction with an input mechanism, or via an instruction provided through the control platform) or automatically (e.g., based on a determination that the weight of the OMPA input exceeds a threshold). |
| Sanitize | Goal: Kill at least a predetermined number (e.g., greater than 99 percent) of pathogens.<br>Details: Settings are similar to HIP, though the temperature is higher. By default, sanitization may be performed before, during, or after HIP. Thus, sanitization may be considered part of HIP in some instances. |
| Low Intensity Processing (LIP) | Goal: Advance drying in a non-intrusive manner while individuals are more likely to be nearby (e.g., during daylight hours).<br>Details: Temperature, airflow, and/or grinding mechanisms can be set to low settings. While LIP may be similar to HIP in operation, LIP may be more suitable if individuals may be nearby. For example, the noise generated by the grinding mechanisms will typically be more tolerable at low settings than at high settings. |
| Burst Grind | Goal: Incorporate wet (e.g., unprocessed) OMPA input into dry (e.g., processed or semi-processed) OMPA input to make drying easier.<br>Details: Temperature and airflow may be maintained at the same settings as the prior state (e.g., HIP or LIP), but the grinding mechanisms can be set to a higher state to grind the wet OMPA input that has been newly added. Burst grind may be performed when new OMPA input is added to the processing chamber while HIP or LIP is being performed. |
| Standby | Goal: Conserve power once the target criteria have been reached.<br>Details: Temperatures, airflow, and/or grinding mechanisms can be off, unless necessary to meet some other criterion. For example, airflow and/or grinding mechanisms may be occasionally triggered to maintain an odor criterion. |
| Cooldown | Goal: Allow the user to handle the processing chamber.<br>Details: Settings are similar to standby, though airflow may be higher if necessary to cool the processing chamber or the product stored therein. |

As mentioned above, the durations of these states can be dynamically determined based on, for example, analysis of outputs generated by sensors housed in the OMPA. However, the durations of these states are predefined—at least initially—in some embodiments. For example, high intensity processing may be programmed to occur for a certain amount of time (e.g., 4, 6, or 8 hours), and burst grind may be programmed to occur for a certain amount of time (e.g., 30 seconds, 5 minutes, 30 minutes) whenever new OMPA input is added. Those skilled in the art will also recognize that the duration of some states could be dynamically determined, while the duration of other states could be predefined. As an example, the OMPA may continue performing high intensity processing until the target criteria are achieved. However, whenever new OMPA input is added, the OMPA may cycle to burst grind for a certain amount of time (e.g., 30 seconds, 5 minutes, 30 minutes) before reverting back to its previous state.

Overview of Control Platform

In some situations, it may be desirable to remotely interface with an OMPA. For example, a user may want to initiate high intensity processing if she is not at home and does not expect to return home for an extended duration (e.g., several hours). This could be done through a control platform that is communicatively connected to the OMPA. Thus, the user may be able to interact with the OMPA through the control platform. Through the control platform, the user may also be able to view information regarding the OMPA (e.g., its current state, average duration of each state, how much OMPA input has been processed over a given interval of time, current weight of the bucket and its contents) through interfaces that are generated by the control platform.

Figure 11:
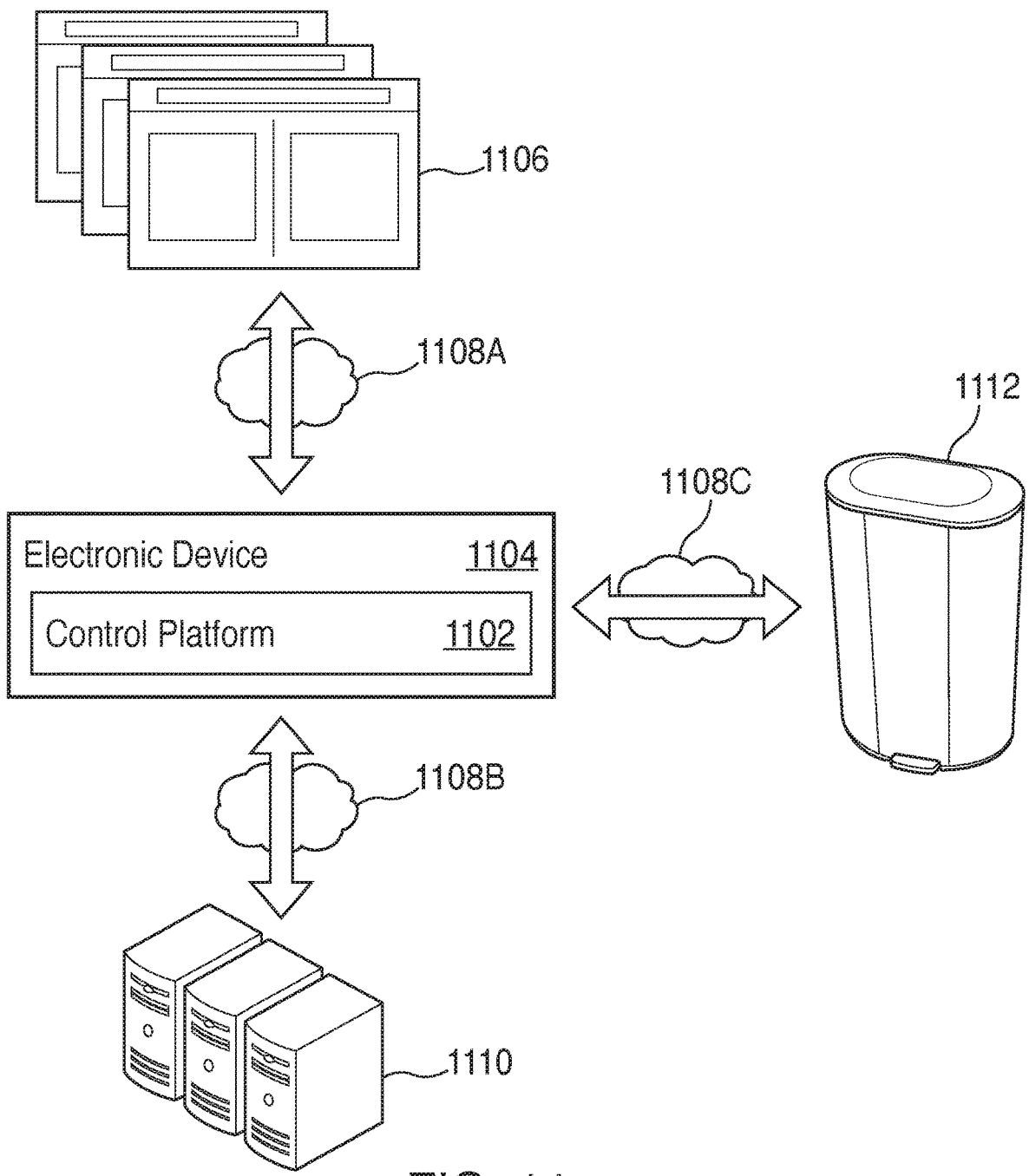
FIG. 11 illustrates a network environment that includes a control platform according to embodiment.

FIG. 11 illustrates a network environment 1100 that includes a control platform 1102. For the purpose of illustration, the control platform 1102 may be described as a computer program that is executing on an electronic device 1104 accessible to a user of OMPA 1112. As discussed above with reference to FIG. 1, OMPA 1112 may include a communication module that is responsible for receiving data from, or transmitting data to, the electronic device 1104 on which the control platform 1102 resides.

Users may be able to interface with the control platform 1102 via interfaces 1106. For example, a user may be able to access an interface through which information regarding OMPA 1112 can be viewed. This information may include historical information related to past performance (e.g., total pounds of OMPA input that has been processed), or this information may include state information related to current activity (e.g., the current state of OMPA 1112, an indication of whether OMPA 1112 is presently connected to the electronic device 1104, an indication of whether OMPA 1112 is presently locked). Thus, a user may be able to educate herself on the OMPA and its contents by reviewing content posted to interfaces generated by the control platform 1102.

Moreover, a user may be able to access an interface through which instructions can be provided to OMPA 1112. Said another way, the user may be able to specify, through the control platform 1102, when or how OMPA 1112 should process OMPA input stored therein. As an example, the OMPA 1112 may initially be configured to perform high intensity processing between 10 PM and 8 AM under the assumption that its ambient environment will generally be devoid of individuals during that timeframe. However, the user may be able to adjust aspects of setup or operation of OMPA 1112 through the control platform 1102. For instance, the user could specify that high intensity processing should not begin until 2 AM, or the user could specify that high intensity processing should not end after 6 AM.

A user could also program, through the control platform 1102, a preference regarding the weight at which to empty the processing chamber of OMPA 1112. On its own, the processing chamber may weigh 8-10 pounds. The total weight of the processing chamber (including its contents) can quickly become unwieldy for some users, such as elderly individuals and juvenile individuals. Accordingly, the control platform 1102 may permit users to define a weight at which to generate notifications (also referred to as "alarms"). Assume, for example, that a user indicates that the total weight of the processing chamber (including its contents) should not exceed 15 pounds through an interface generated by the control platform 1102. In such a scenario, the control platform 1102 may monitor mass measurements received from OMPA 1112 and then generate a notification in response to determining that the total weight of the processing chamber (including its contents) is within a certain amount of 15 pounds. The certain amount may be a fixed value (e.g., 1 pound or 2 pounds), or the certain amount may be a dynamically determined value (e.g., 5 percent or 10 percent of the weight specified by the user).

The notification could be presented in various ways. In embodiments where the control platform 1102 is implemented as a computer program executing on an electronic device 1104 as shown in FIG. 11, the notification may be generated by the computer program (e.g., in the form of a push notification). Additionally or alternatively, the control platform 1102 may transmit an instruction to OMPA 1112 to generate the notification. Accordingly, the notification could be a visual, audible, or tactile notification that is generated by the electronic device 1104 or OMPA 1112.

As shown in FIG. 11, the control platform 1102 may reside in a network environment 1100. Thus, the electronic device 1104 on which the control platform 1102 is implemented may be connected to one or more networks 1108A-C. These networks 1108A-C may be personal area networks (PANs), local area networks (LANs), wide area networks (WANs), metropolitan area networks (MANs), cellular networks, or the Internet. Additionally or alternatively, the electronic device 1104 could be communicatively connected to other electronic devices—including OMPA 1112—over a short-range wireless connectivity technology, such as Bluetooth, NFC, Wi-Fi Direct (also referred to as "Wi-Fi P2P"), and the like.

In some embodiments, at least some components of the control platform 1102 are hosted locally. That is, part of the control platform 1102 may reside on the electronic device 1104 that is used to access the interfaces 1106 as shown in FIG. 11. For example, the control platform 1102 may be embodied as a mobile application that is executable by a mobile phone. Note, however, that the mobile application may be communicatively connected to (i) OMPA 1112 and/or (ii) a server system 1110 on which other components of the control platform 1102 are hosted.

In other embodiments, the control platform 1102 is executed entirely by a cloud computing service operated by, for example, Amazon Web Services®, Google Cloud Platform™, or Microsoft Azure®. In such embodiments, the control platform 1102 may reside on a server system 1110 that is comprised of one or more computer servers. These computer servers can include different types of data (e.g., regarding batches of product that have been produced by OMPAs associated with different users), algorithms for implementing the routine described above (e.g., based on knowledge regarding ambient temperatures, humidity, etc.), algorithms for tailoring or training the routine described above (e.g., based on knowledge gained from nearby OMPAs or comparable OMPAs), and other assets (e.g., user credentials). Those skilled in the art will recognize that this information could also be distributed amongst the server system 1110 and one or more other electronic devices. For example, some data that is generated by a given OMPA may be stored on, and processed by, that OMPA or an electronic device that is "paired" with that OMPA. Thus, not all data generated by OMPAs—or even the control platform—may be transmitted to the server system 1110 for security or privacy purposes.

One benefit of having a network-connected OMPA is that it enables connectivity with other electronic devices, and thus integration into related systems.

Assume, for example, that a user purchases and then deploys a OMPA in a home. This OMPA may include a set of instructions (also referred to as the "intelligent time recipe") that, when executed, indicate how its components are to be controlled. These instructions may involve the execution of heuristics, algorithms, or computer-implemented models. Rather than learn best practices "from scratch," the OMPA (or a control platform to which it is communicatively connected) may be able to learn from the experiences of other OMPAs. These OMPAs may be located nearby, and therefore may experience comparable ambient conditions such as humidity, temperature, and the like. Alternatively, these OMPAs may be comparable, for example, in terms of amount of actual or expected OMPA input, type of actual or expected OMPA input, number of users (e.g., a single individual versus a family of four individuals), etc. Thus, knowledge may be shared among OMPAs as part of a networked machine learning scheme. Referring again to the above-mentioned example, the OMPA may initiate a connection with a control platform after being deployed in the home. In such a scenario, the control platform may provide another set of instructions that is learned based on knowledge gained by the control platform from analysis of the activities of other OMPAs. Accordingly, the control platform may further develop instruction sets based on machine learning. Learning may be performed continually (e.g., as OMPAs perform activities and generate data), and insights gained through learning may be provided continually or periodically. For instance, the control platform may communicate instructions to a OMPA whenever a new set is available, or the control platform may communicate a new set of instructions to an OMPA only upon receiving input (e.g., from the corresponding user) indicating that the OMPA is not operating as expected.

As another example, assume that a municipality is interested in collecting the products produced by various OMPAs for further processing (e.g., composting). In such a scenario, the municipality may be interested in information such as the weight and water content of product that is available for collection. Each OMPA may not only have the sensors needed to measure these characteristics as discussed above but may also have a communication module that is able to transmit measurements elsewhere. In some embodiments, these OMPA directly transmit the measurements to the municipality (e.g., by uploading to a network-accessible data interface, such as an application programming interface). In other embodiments, these OMPAs indirectly transmit the measurements to the municipality (e.g., by forwarding to respective control platforms, which then transmit the measurements—or analyses of the measurements—onward to the municipality). With these measurements, the municipality may be able to retrieve, transport, and handle the products produced by these OMPAs in a more intelligent manner. For example, the municipality may have a better understanding of when retrieval needs to occur, and how much storage space is needed for the products, if the weight is shared.

Users may also be able to communicate with one another, directly or indirectly, through OMPA. Assume, for example, that a first OMPA has finished processing its OMPA input into a product. Although processing is complete, a corresponding first user may not be ready to offload the product. In such a situation, a second user who is located nearby (e.g., as determined based on information generated by the respective OMPA, information input by the respective users, etc.) may offer to handle the product. For instance, the second user may retrieve the product from the first user and then handle it, add it to her own product, etc. Users may be able to communicate through the interfaces 1106 generated by the control platform 1102, or users may be able to communicate directly through their respective OMPAs.

Computing System

Figure 12:
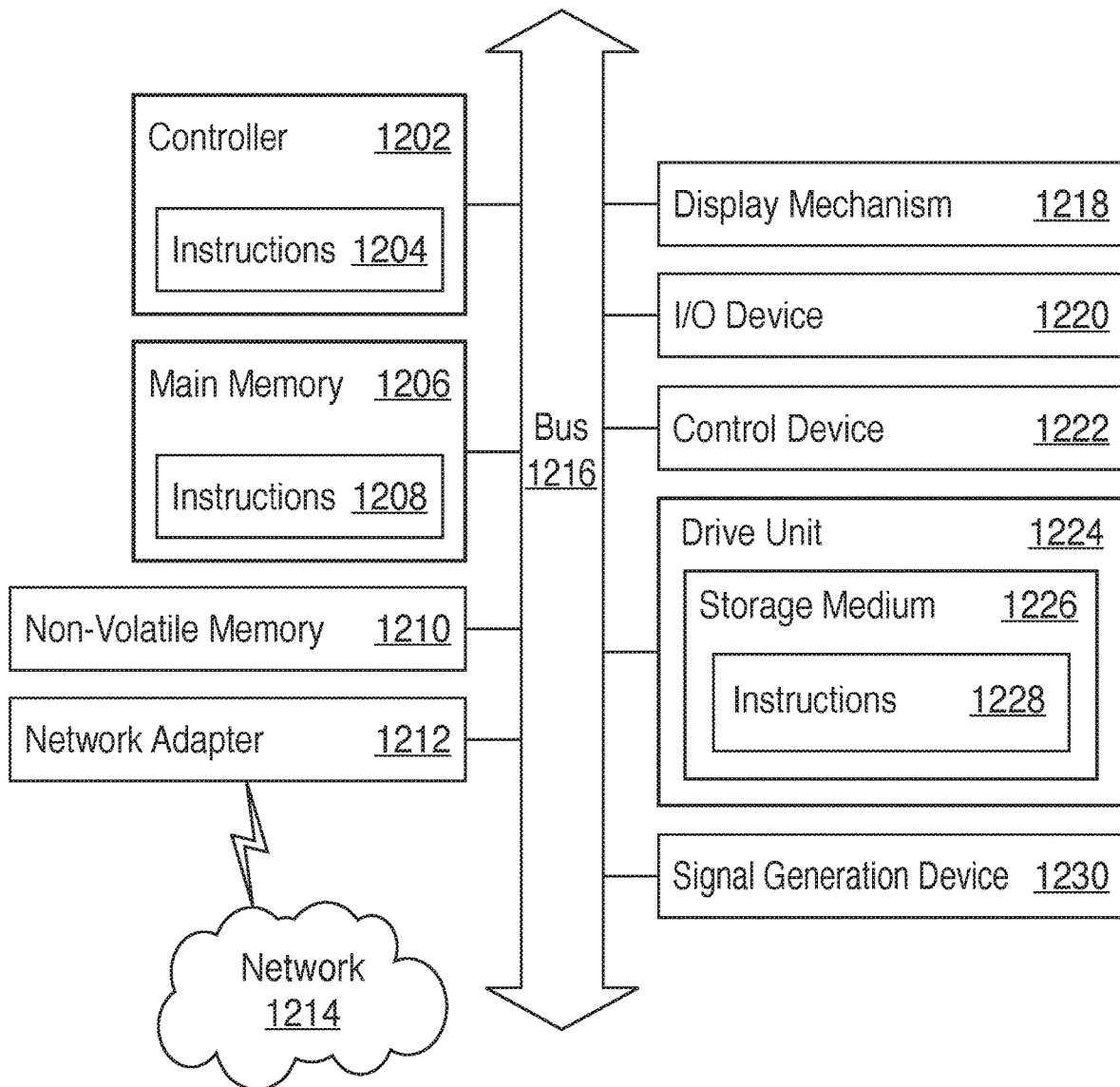
FIG. 12 is a block diagram illustrating an example of a computing system in which at least some operations described herein can be implemented according to embodiment.

FIG. 12 is a block diagram illustrating an example of a computing system 1200 in which at least some operations described herein can be implemented. For example, components of the computing system 1200 may be hosted on an OMPA that is tasked with converting OMPA input into a more stable product. As another example, components of the computing system 1200 may be hosted on an electronic device that is communicatively connected to an OMPA.

The computing system 1200 may include a controller 1202, main memory 1206, non-volatile memory 111210, network adapter 1212, display mechanism 1218, input/output (I/O) device 1220, control device 1222, drive unit 1224 including a storage medium 1226, and signal generation device 1230 that are communicatively connected to a bus 1216. The bus 1216 is illustrated as an abstraction that represents one or more physical buses or point-to-point connections that are connected by appropriate bridges, adapters, or controllers. The bus 1216, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), inter-integrated circuit (I2C) bus, or an Institute of Electrical and Electronics Engineers (IEEE) standard 1394 bus (also referred to as "Firewire").

While the main memory 1206, non-volatile memory 1210, and storage medium 1226 are shown to be a single medium, the terms "machine-readable medium" and "storage medium" should be taken to include a single medium or multiple media (e.g., a database distributed across more than one computer server) that store instructions 1228. The terms "machine-readable medium" and "storage medium" shall also be taken to include any medium that is capable of storing, encoding, or carrying instructions for execution by the computing system 1200.

In general, the routines executed to implement the embodiments of the present disclosure may be implemented as part of an operating system or a specific computer program. Computer programs typically comprise instructions (e.g., instructions 1204, 1208, 1228) that are set at various times in various memory and storage devices in an electronic device. When read and executed by the controller 1202, the instructions cause the computing system 1200 to perform operations to execute various aspects of the present disclosure.

The network adapter 1212 enables the computing system 1200 to mediate data in a network 1214 with an entity that is external to the computing system 1200 through any communication protocol that is supported by the computing system 1200 and the external entity. The network adapter 1212 can include a network adaptor card, wireless network interface card, router, access point, wireless router, switch, protocol converter, gateway, bridge, hub, digital media receiver, repeater, or any combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

The following provides a listing of various claim sets focusing on OMPAs and the use thereof. The claims, including the incorporated disclosures, cover various embodiments or configurations, methods, algorithms, and structures related to the embodiments defined herein. Features may be mixed between the various claim sets. Thus, various concepts covered in these claims can be integrated into different embodiments. The statement sets below are organized into different concepts. Each statement can be combined with any other statement. References to "any previous statement" expressly extend beyond just the particular subset of statements but refers to any of the statements below.

Statement 1. An organic matter processing apparatus (OMPA), comprising:
  a processing chamber for processing organic matter, the processing chamber comprising a grinding mechanism operative to cut, grind, and separate OMPA input contained in the processing chamber according to a grinding cycle;
  an interface through which OMPA input is deposited into the processing chamber and OMPA output is retrieved from the processing chamber;
  drying mechanisms operative to remove moisture from the OMPA input contained in the processing chamber according to a drying cycle;
  a sensor system for measuring mass;
  a sensor for monitoring temperature and/or humidity; and
  a processor operative to control the grinding cycle and the drying cycle to convert OMPA input to OMPA output based on a dynamically adjustable schedule, the measured mass, and the monitored temperature and/or humidity.

Statement 2. The OMPA of any previous statement, wherein the grinding mechanism comprises:
  a motor;
  at least one stationary blade; and
  at least one rotating multi-prong blade operative to rotate in response to activation of the motor such that an airgap existing between prongs of the multi-prong blade interfaces with the at least one stationary blade while the prongs pass over the at least one stationary blade.

Statement 3. The OMPA of any previous statement, wherein the at least one rotating multi-prong blade rotates about an axis that is parallel to a surface plane on which the OMPA resides.

Statement 4. The OMPA of any previous statement, wherein the grinding mechanism further comprises a least one paddle operative to rotate about the axis in response to activation of the motor.

Statement 5. The OMPA of any previous statement, wherein the drying mechanisms comprise:
  a fan that reduces moisture by providing airflow into the processing chamber; and
  a heater that reduces moisture by providing heat to the processing chamber.

Statement 6. The OMPA of any previous statement, further comprising:
  an input mechanism for receiving user input to control operation of the OMPA; and
  an output mechanism for providing information related to operation of the OMPA.

Statement 7. The OMPA of any previous statement, further comprising wireless communications circuitry for communicating with a device or server that is located remotely from the OMPA.

Statement 8. The OMPA of any previous statement, further comprising:
a proximity sensing system operative to detect presence of individuals who frequent a physical space in which the OMPA is placed, wherein over time, outputs provided by proximity sensing system are used by the processor to adjust the schedule.

Statement 9. The OMPA of any previous statement, wherein the proximity sensing system is an infrared emitter and detector, light detection and ranging (LIDAR) system, a microphone, sonar, or wireless detection of a devices within proximity of the OMPA.

Statement 10. The OMPA of any previous statement, further comprising a durable housing having a height, width, and depth, wherein the processing chamber, the drying mechanism, the sensor system, the sensor, and the processor are contained within the durable housing, and wherein the height has a larger dimension than dimensions of the width and depth.

Statement 11. The OMPA of any previous statement, wherein the processing chamber is a bucket that is user-removable from the durable housing, and wherein the bucket comprises a handle and an integrated pour spout.

Statement 12. The OMPA of any previous statement, further comprising:
an air treatment mechanism operative to convert untreated air received from the processing chamber to treated air prior to discharging the treated air from the OMPA;
an air channel coupling an inlet positioned adjacent to the processing chamber to an inlet of the air treatment mechanism;
a vertical pillar comprising a bottom portion, a top portion, and a plenum portion formed between the bottom and top portions, wherein the top portion comprises at least one opening for egressing treated air, wherein the bottom portion that is coupled to receive treated air from an outlet of the air treatment mechanism, and wherein the treated air is directed upwards through the plenum portion to the at least one opening.

Statement 13. The OMPA of any previous statement, wherein the air treatment mechanism comprises a dry media chamber.

Statement 14. The OMPA of any previous statement, further comprising an air treatment pathway comprising a used-air intake vent, a channel, a fan, a photolysis chamber, a heater, a dry media chamber, and at least one opening to an ambient environment.

Statement 15. The OMPA of any previous statement, wherein the used-air intake vent is positioned adjacent to an opening of the processing chamber, wherein the channel is coupled to the used-air intake vent and the fan, wherein the fan is fluidically coupled to the photolysis chamber, wherein the photolysis chamber is fluidically coupled to the heater, and wherein the heater is fluidically coupled to the dry media chamber, and wherein the dry media chamber is fluidically coupled to the at least one opening.

Statement 16. The OMPA of any previous statement, wherein the processor is further operative to cycle between a plurality of states to control conversion of OMPA input to OMPA output, wherein each state operates the grinding cycle and the drying cycle according to state specific parameters.

Statement 17. The OMPA of any previous statement, wherein the plurality of states comprise a high intensity processing (HIP) state, a sanitize state, a cooldown state, a low intensity processing (LIP) state, a burst grind state, and a standby state.

Statement 18. The OMPA of any previous statement, wherein the grinding cycle is controlled by operating a motor;
wherein the drying cycle is controlled by operating a heater and a fan;
wherein state specific parameters for the HIP state comprise a first temperature setting for the heater, a first fan speed for the fan, and a first motor speed for the motor;
wherein state specific parameters for the sanitize state comprise a second temperature setting for the heater, wherein the second temperature setting is higher than the first temperature setting, and the first motor speed for the motor;
wherein state specific parameters for the cooldown state comprise the first fan speed for the fan and the first motor speed for the motor;
wherein state specific parameters for the standby state comprise turning the heater, the fan, and the motor off;
wherein state specific parameters for the LIP state comprises a second motor speed for the motor, wherein the second motor speed is slower than the first motor speed; and
wherein the burst grind state comprises a third motor speed for the motor, wherein the third motor speed is between the first motor speed and the second motor speed.

Statement 19. A method for operating an organic matter processing apparatus (OMPA), comprising:
obtaining data from a plurality of sensors; and
cycling between a plurality of states to control conversion of OMPA input to OMPA output by drying and grinding the OMPA input according to control parameters defined by the plurality of states, wherein the control parameters for the plurality of states are predetermined, based on user input, or dynamically computed as a function of the data obtained by the plurality of sensors, and wherein the control parameters include a schedule for when each state is permitted to be executed and a runtime duration for each state.

Statement 20. The method of any previous statement, wherein the runtime duration for each state is fixed, set based on the data obtained by the plurality of sensors, or dynamically adjusted while the state is being executed, wherein the dynamic adjustments are based on the data obtained by the plurality of sensors.

Statement 21. The method of any previous statement, wherein the runtime duration for each state is fixed or is dynamically determined based on the data obtained by the plurality of sensors, Statement 22. The method of any previous statement, wherein a first subset of the plurality of states comprises a fixed runtime duration, and wherein a second subset of the plurality of states comprises a runtime duration computed based on mass data obtained from at least one of the sensors.

Statement 23. The method of any previous statement, wherein the runtime duration for a state included in the second subset of the plurality of states is adjusted based on humidity data obtained from at least one of the sensors, temperature data obtained from at least one of the sensors, a delta change in mass, and a combination thereof.

Statement 24. The method of any previous statement, wherein the runtime duration for a first subset of the plurality of states is permanently fixed, and wherein the runtime duration for a second subset of the plurality of states is initially predefined and optionally dynamically adjusted based on data obtained by the plurality of sensors.

Statement 25. The method of any previous statement, wherein said drying comprises:
   activating a first heater to heat the processing chamber; and
   activating a first fan to inject ambient air into the processing chamber.

Statement 26. The method of any previous statement, wherein said drying further comprises activating a second heater to heat the ambient air being injected into the processing chamber.

Statement 27. The method of any previous statement, wherein said grinding comprises:
   activating a motor to drive a grinding mechanism.

Statement 28. The method of any previous statement, wherein said obtaining data comprises:
   obtaining humidity data;
   obtaining temperature data; and
   obtaining mass data.

Statement 29. The method of any previous statement, wherein said obtaining data further comprises obtaining volatile organic compound data.

Statement 30. An organic matter processing apparatus (OMPA), comprising:
   a bucket assembly for processing organic matter, comprising:
      a housing comprising:
         an opening through which organic matter can be deposited and removed and a cavity that is at least partially defined by a plurality of interior surfaces;
         a curved metal plate, wherein the cavity is further defined by the curved metal plate and the plurality of interior surfaces; and
         a blade array coupled to a cavity facing side of the curved metal plate;
      a heater operative to apply heat to a first side of curved metal plate, wherein the first side is opposite of the cavity facing side; and
      a grinding mechanism assembly comprising:
         a rod member having a center axis aligned parallel to a surface on which the OMPA resides;
         at least one multi-prong blade secured to the rod member and that extends radially away from the center axis;
         at least one paddle secured to the rod member and that extends radially away from the center axis; and
         wherein the grinding mechanism assembly is operative to rotate around the center axis within the cavity such that the at least one multi-prong blade and the least one paddle pass by the blade array during rotation.

Statement 31. The OMPA of any previous statement, further comprising:
   a motor; and
   a gear set coupled to the motor and to the rod member, wherein activation of the motor causes the grinding mechanism assembly to rotate, via the gear set, around the center axis.

Statement 32. The OMPA of any previous statement, wherein the at least one multi-prong blade and the blade array interact to cut OMPA input.

Statement 33. The OMPA of any previous statement, wherein the at least one paddle is oriented at an angle to promote upward and sideward movement of OMPA input within the cavity.

Statement 34. The OMPA of any previous statement, wherein shearing capacity of the at least one multi-prong is greater than shearing capacity of the at least one paddle.

Statement 35. The OMPA of any previous statement, wherein the rotation rate of the grinder mechanism assembly is between 1-2 RPMs.

Statement 36. The OMPA of any previous statement, wherein a the blade array comprises at least two stationary blades each having a respective vertical axis that is perpendicular to the center axis.

Statement 37. The OMPA of any previous statement, wherein the at least one multi-prong blade comprises a first two-prong blade and a second two-prong blade, wherein an offset in orientation between the first blade and the second blade is such that only one of the first blade and the second blade is interacting with the blade array at any given point of time during rotation of the grinder mechanism assembly.

Statement 38. The OMPA of any previous statement, wherein a first of the at least one multi-prong blade and a first of the at least one paddle are offset by 160-180 degrees from each other.

Statement 39. The OMPA of any previous statement, wherein the bucket assembly further comprises:
   an electrical interface for providing power to the heater, wherein the heater is a flexible heater mounted to the first side of the curved metal plate;
   a mechanical interface for coupling to a motor;
   an integrated pour spout; and
   a handle.

Statement 40. An organic matter processing apparatus (OMPA), comprising:
   a housing comprising an aperture and a processing chamber;
   a lid coupled to the housing and operative to rotate about a pivot axis to open and close, where in the lid is positioned over the aperture when in a closed position, the lid assembly comprising:
      a plurality of air ingress openings; and
      a first fan operative to pull in ambient air through the plurality of air ingress openings and force the ambient air through the aperture into the processing chamber when the lid is closed and the first fan is turned on.

Statement 41. The OMPA of any previous statement, wherein the lid further comprises a latch, and wherein the housing comprises further a locking mechanism constructed to interface with latch when the lid closed, wherein the locking mechanism is operative to lock and unlock the lid.

Statement 42. The OMPA of any previous statement, wherein the plurality of ingress openings are positioned along a periphery of the lid.

Statement 43. The OMPA of any previous statement, wherein the housing comprises:
   a vertical pillar comprising at least one exhaust port;
   a used-air intake vent coupling an inlet positioned adjacent to the processing chamber to an inlet of a second fan, wherein the second fan is operative to pull untreated air from the processing chamber; and
   an air treatment mechanism coupled to an outlet of the second fan, wherein the air treatment mechanism is operative to convert the untreated air to treated air, and wherein the second fan is further operative to expel the treated air from the OMPA via the at least one exhaust port.

Statement 44. The OMPA of any previous statement, wherein the second fan is turned on when the lid is open to mitigate escape of untreated air.

Statement 45. The OMPA of any previous statement, wherein the second fan operates at the same or a greater air flow rate than the first fan.

Statement 46. The OMPA of any previous statement, further comprising:
a processor; and
an electro-mechanical pedal switch that is user depressible, wherein the processor is operative to detect depression of the electro-mechanical pedal switch and selectively cause the lid to open.

Statement 47. The OMPA of any previous statement, wherein the processor is operative to detect release of the electro-mechanical pedal switch and selectively cause the lid to close.

Statement 48. The OMPA of any previous statement, further wherein the processor is operative to control a lid opening speed, control a lid closing speed, and control a lid opening angle.

Statement 49. The OMPA of any previous statement, further comprising a movable bezel that frames the aperture and is positioned on top of the housing when the lid is closed.

Statement 50. An organic matter processing apparatus (OMPA), comprising:
a processing chamber for processing organic matter;
an odor treatment system coupled to receive used air from the processing chamber, the odor treatment system comprising:
an exhaust hood comprising a used-air intake vent secured adjacent to the processing chamber;
a fan coupled to the exhaust hood and operative to pull used air from the processing chamber and to push the used air into an air treatment mechanism, wherein the air treatment mechanism converts the used air to treated air; and
at least one air egress opening positioned downstream from the air treatment mechanism to provide egress for the treated air out of the OMPA; and
a controller operative to cycle between a plurality of sates to control conversion of OMPA input to OMPA output according to control parameters define by the plurality of states, wherein the control parameters set a fan speed for the fan for each state.

Statement 51. The OMPA of any previous statement, wherein the air treatment mechanism is a dry media chamber comprising material that adsorbs odor-causing molecules.

Statement 52. The OMPA of any previous statement, wherein the material comprises one or more of activated carbon, charcoal, coconut shell carbon, and manganese dioxide.

Statement 53. The OMPA of any previous statement, further comprising:
a vertical pillar structure that extends along a rear side of the OMPA, the vertical pillar structure comprising a plenum positioned downstream of the air treatment mechanism and wherein the at least one air egress opening is fluidically coupled to the plenum.

Statement 54. The OMPA of any previous statement, further comprising a sensor coupled to the vertical pillar structure to monitor volatile organic compounds, temperature, and relative humidity of the treated air.

Statement 55. The OMPA of any previous statement, wherein exhaust hood extends downward from a top portion of the processing chamber to the fan, which is located near a bottom portion of the OMPA, and wherein the at least one air egress opening is located above the air treatment mechanism.

Statement 56. The OMPA of any previous statement, wherein the OMPA has a rear surface, and wherein the at least one air egress opening is oriented to promote expulsion of the treated air at an angle that is not perpendicular to the rear surface.

Statement 57. The OMPA of any previous statement, further comprising a sensor coupled to the exhaust hood to monitor volatile organic compounds, temperature, and relative humidity of the used-air.

Statement 58. The OMPA of any previous statement, wherein the plurality of states comprise a high intensity processing state (HIP), a sanitize state, and a cool down state, wherein a fan speed during the HIP state is higher than a fan speed for the sanitize and cool down states.

Statement 59. The OMPA of any previous statement, wherein the plurality of states comprise a standby state, wherein the fan is turned off during the standby state.

What is claimed is:

1. An organic matter processing apparatus (OMPA), comprising:
a processing chamber for processing organic matter, the processing chamber comprising a grinding mechanism operative to cut, grind, and separate OMPA input contained in the processing chamber according to a grinding cycle, wherein the grinding mechanism comprises:
a motor;
at least one stationary blade; and
at least one rotating multi-prong blade configured to rotate in response to activation of the motor such that an airgap existing between prongs of the multi-prong blade interfaces with the at least one stationary blade while the prongs pass over the at least one stationary blade;
an interface through which OMPA input is deposited into the processing chamber and OMPA output is retrieved from the processing chamber;
drying mechanisms operative to remove moisture from the OMPA input contained in the processing chamber according to a drying cycle;
a sensor system for measuring mass;
a sensor for monitoring temperature and/or humidity; and
a processor configured to control the grinding cycle and the drying cycle to convert OMPA input to OMPA output based on a dynamically adjustable schedule, the measured mass, and the monitored temperature and/or humidity.

2. The OMPA of claim 1, wherein the at least one rotating multi-prong blade rotates about an axis that is parallel to a surface plane on which the OMPA resides.

3. The OMPA of claim 1, wherein the grinding mechanism further comprises a least one paddle configured to rotate in response to activation of the motor.

4. The OMPA of claim 1, wherein the drying mechanisms comprise:
a fan that reduces moisture by providing airflow into the processing chamber; and
a heater that reduces moisture by providing heat to the processing chamber.

5. The OMPA of claim 1, further comprising:
an input mechanism for receiving user input to control operation of the OMPA; and
an output mechanism for providing information related to operation of the OMPA.

6. The OMPA of claim 5, further comprising wireless communications circuitry for communicating with a device or server that is located remotely from the OMPA.

7. The OMPA of claim 1, further comprising:
a proximity sensing system configured to detect presence of individuals who frequent a physical space in which the OMPA is placed, wherein over time, outputs provided by proximity sensing system are used by the processor to adjust the schedule.

8. The OMPA of claim 7, wherein the proximity sensing system is an infrared emitter and detector, light detection and ranging (LIDAR) system, a microphone, sonar, or wireless detection of a devices within proximity of the OMPA.

9. The OMPA of claim 1, further comprising a durable housing having a height, width, and depth, wherein the processing chamber, the drying mechanism, the sensor system, the sensor, and the processor are contained within the durable housing, and wherein the height has a larger dimension than dimensions of the width and depth.

10. The OMPA of claim 9, wherein the processing chamber is a bucket that is user-removable from the durable housing, and wherein the bucket comprises a handle and an integrated pour spout.

11. An organic matter processing apparatus (OMPA), comprising:
a processing chamber for processing organic matter, the processing chamber comprising a grinding mechanism operative to cut, grind, and separate OMPA input contained in the processing chamber according to a grinding cycle;
an interface through which OMPA input is deposited into the processing chamber and OMPA output is retrieved from the processing chamber;
drying mechanisms operative to remove moisture from the OMPA input contained in the processing chamber according to a drying cycle;
a sensor system for measuring mass;
a sensor for monitoring temperature and/or humidity;
a processor configured to control the grinding cycle and the drying cycle to convert OMPA input to OMPA output based on a dynamically adjustable schedule, the measured mass, and the monitored temperature and/or humidity;
an air treatment mechanism configured to convert untreated air received from the processing chamber to treated air prior to discharging the treated air from the OMPA;
an air channel coupling an inlet positioned adjacent to the processing chamber to an inlet of the air treatment mechanism; and
a vertical pillar comprising a bottom portion, a top portion, and a plenum portion formed between the bottom and top portions, wherein the top portion comprises at least one opening for egressing treated air, wherein the bottom portion that is coupled to receive treated air from an outlet of the air treatment mechanism, and wherein the treated air is directed upwards through the plenum portion to the at least one opening.

12. The OMPA of claim 11, wherein the air treatment mechanism comprises a dry media chamber.

13. The OMPA of claim 11, further comprising an air treatment pathway comprising a used-air intake vent, a channel, a fan, a dry media chamber, and at least one opening to an ambient environment.

14. The OMPA of claim 13, wherein the used-air intake vent is positioned adjacent to an opening of the processing chamber, wherein the channel is coupled to the used-air intake vent and the fan, wherein the fan is fluidically coupled to the dry media chamber, and wherein the dry media chamber is fluidically coupled to the at least one opening to the ambient environment.

15. The OMPA of claim 1, wherein the processor is further configured to cycle between a plurality of states to control conversion of OMPA input to OMPA output, wherein each state operates the grinding cycle and the drying cycle according to state specific parameters.

16. The OMPA of claim 15, wherein the plurality of states comprise a high intensity processing (HIP) state, a sanitize state, a cooldown state, a low intensity processing (LIP) state, a burst grind state, a standby state, and any combination thereof.

17. The OMPA of claim 16, wherein the grinding cycle is controlled by operating a motor;
wherein the drying cycle is controlled by operating a heater and a fan;
wherein state specific parameters for the HIP state comprise a first temperature setting for the heater, a first fan speed for the fan, and a first motor speed for the motor;
wherein state specific parameters for the sanitize state comprise a second temperature setting for the heater, wherein the second temperature setting is higher than the first temperature setting, and the first motor speed for the motor;
wherein state specific parameters for the cooldown state comprise the first fan speed for the fan and the first motor speed for the motor;
wherein state specific parameters for the standby state comprise turning the heater, the fan, and the motor off;
wherein state specific parameters for the LIP state comprises a second motor speed for the motor, wherein the second motor speed is slower than the first motor speed; and
wherein the burst grind state comprises a third motor speed for the motor, wherein the third motor speed is between the first motor speed and the second motor speed.

* * * * *